US008709696B2

(12) United States Patent
Wang et al.

(10) Patent No.: US 8,709,696 B2
(45) Date of Patent: *Apr. 29, 2014

(54) CURABLE SUBLIMATION MARKING MATERIAL AND SUBLIMATION TRANSFER PROCESS USING SAME

(75) Inventors: Yulin Wang, Oakville (CA); Ke Zhou, Oakville (CA); Tie Hwee Ng, Mississauga (CA); Marko Saban, Toronto (CA)

(73) Assignee: Xerox Corporation, Norwalk, CT (US)

( * ) Notice: Subject to any disclaimer, the term of this patent is extended or adjusted under 35 U.S.C. 154(b) by 534 days.

This patent is subject to a terminal disclaimer.

(21) Appl. No.: 12/856,975

(22) Filed: Aug. 16, 2010

(65) Prior Publication Data

US 2012/0040287 A1 Feb. 16, 2012

(51) Int. Cl.
*G03G 13/16* (2006.01)

(52) U.S. Cl.
USPC ......... 430/124.4; 430/106.1; 430/110.2; 430/125.32; 430/124.12; 106/31.13; 106/31.44; 106/31.49

(58) Field of Classification Search
USPC .......... 430/106.1, 110.2; 101/491; 347/102
See application file for complete search history.

(56) References Cited

U.S. PATENT DOCUMENTS

| 4,081,277 | A | 3/1978 | Brault et al. |
| 4,935,326 | A | 6/1990 | Creatura et al. |
| 4,937,166 | A | 6/1990 | Creatura et al. |
| 5,290,654 | A | 3/1994 | Sacripante et al. |
| 5,308,734 | A | 5/1994 | Sacripante et al. |
| 5,366,836 | A | 11/1994 | Snelling |
| 5,370,963 | A | 12/1994 | Patel et al. |
| 5,436,217 | A | 7/1995 | Van Steen et al. |
| 5,593,807 | A | 1/1997 | Sacripante et al. |
| 5,902,771 | A | 5/1999 | Slark et al. |
| 5,917,530 | A | 6/1999 | Hutt et al. |
| 6,052,139 | A | 4/2000 | Hetzer |
| 6,057,264 | A | 5/2000 | Bradbury |
| 6,170,933 | B1 | 1/2001 | Nitta et al. |
| 6,270,933 | B1 | 8/2001 | Thompson |
| 6,713,222 | B2 | 3/2004 | Sacripante et al. |
| 6,800,166 | B2 | 10/2004 | Kosaka et al. |
| 6,832,832 | B2 | 12/2004 | Martin et al. |

(Continued)

OTHER PUBLICATIONS

U.S. Patent Application filed of even date herewith, of Yulin Wang et al., entitled "Curable Sublimation Toner and Sublimation Transfer Process Using Same" 67 pages, 4 drawing sheets, U.S. Appl. No. 12/856,987, not yet published.

(Continued)

*Primary Examiner* — Mark F Huff
*Assistant Examiner* — Rashid Alam
(74) *Attorney, Agent, or Firm* — Marylou J. Lavoie

(57) ABSTRACT

A curable sublimation marking material including at least one curable component and at least one sublimation colorant. Also disclosed is a transfer printing method including applying a curable sublimation marking material in a desired pattern onto a transfer substrate to form an image on the transfer substrate at a first temperature which is below the sublimation temperature of the sublimation colorant; wherein the curable sublimation marking material comprises at least one curable component and at least one sublimation colorant; curing the image on the transfer substrate; and optionally, bringing the transfer substrate into contact with a final image-receiving substrate, optionally applying pressure, and heating to a second temperature which is sufficient to cause the sublimation colorant to sublime and form a permanent image on the final image-receiving substrate.

4 Claims, 4 Drawing Sheets

(56) References Cited

U.S. PATENT DOCUMENTS

| | | |
|---|---|---|
| 6,849,311 B2 | 2/2005 | Yoshinari et al. |
| 6,946,424 B2 | 9/2005 | Ieshige et al. |
| 6,951,696 B2 | 10/2005 | Ozaki |
| 7,029,817 B2 | 4/2006 | Robinson et al. |
| 7,033,974 B2 | 4/2006 | Ishida et al. |
| 7,138,163 B2 | 11/2006 | Ieshige et al. |
| 7,234,805 B2 | 6/2007 | Maekawa et al. |
| 7,237,886 B2 | 7/2007 | Maekawa et al. |
| 7,259,275 B2 | 8/2007 | Belelie et al. |
| 7,279,587 B2 | 10/2007 | Odell et al. |
| 7,329,476 B2 | 2/2008 | Sacripante et al. |
| 7,432,324 B2 | 10/2008 | Chen et al. |
| 7,479,307 B2 | 1/2009 | Fromm et al. |
| 7,510,617 B2 | 3/2009 | Kosaka et al. |
| 7,531,582 B2 | 5/2009 | Toma et al. |
| 7,578,587 B2 | 8/2009 | Belelie et al. |
| 7,625,956 B2 | 12/2009 | Odell et al. |
| 7,714,040 B2 | 5/2010 | Toma et al. |
| 2005/0191573 A1 | 9/2005 | Smith |
| 2005/0199152 A1* | 9/2005 | Hale et al. ............ 101/491 |
| 2006/0100300 A1 | 5/2006 | Sacripante et al. |
| 2006/0216626 A1 | 9/2006 | Sacripante et al. |
| 2008/0107990 A1 | 5/2008 | Field et al. |
| 2008/0236446 A1 | 10/2008 | Zhou et al. |
| 2009/0047593 A1 | 2/2009 | Vanbesien et al. |

OTHER PUBLICATIONS

U.S. Patent Application filed of even date herewith, of Yulin Wang et al., entitled "Curable Sublimation Ink and Sublimation Transfer Process Using Same" 45 pages, 4 drawing sheets, U.S. Appl. No. 12/856,999, not yet published.

U.S. Patent Application filed Nov. 3, 2009, of Yulin Wang et al., entitled "Chemical Toner Containing Sublimation Colorant for Secondary Transfer Process" 44 pages, U.S. Appl. No. 12/611,336, not yet published.

* cited by examiner

CURABLE SUBLIMATION MARKING MATERIAL AND SUBLIMATION TRANSFER PROCESS USING SAME

RELATED APPLICATIONS

Commonly assigned U.S. patent application Ser. No. 12/856,987, filed of even date herewith, of Yulin Wang, Ke Zhou, T. Hwee Ng, and Marko Saban, entitled "Curable Sublimation Toner And Sublimation Transfer Process Using Same," which is hereby incorporated by reference herein in its entirety, describes a transfer printing method comprising applying a curable sublimation toner comprising at least one curable component and at least one sublimation colorant in a desired pattern onto a transfer substrate to form an image on the transfer substrate at a first temperature which is below a sublimation temperature of the sublimation colorant; wherein the curable sublimation toner comprises a conventional toner or a chemical toner; and wherein the curable sublimation toner comprises at least one curable amorphous resin and optionally, a crystalline resin; curing the image on the transfer substrate; and optionally, bringing the transfer substrate into contact with a final image-receiving substrate, optionally applying pressure, and heating to a second temperature which is sufficient to cause the sublimation colorant to sublime and form a permanent image on the final image-receiving substrate.

Commonly assigned U.S. patent application Ser. No. 12/856,999, filed of even date herewith, of Yulin Wang, Ke Zhou, T. Hwee Ng, and Marko Saban, entitled "Curable Sublimation Ink And Sublimation Transfer Process Using Same," which is hereby incorporated by reference herein in its entirety, describes a transfer printing method comprising applying a curable sublimation ink comprising at least one curable component and at least one sublimation colorant in a desired pattern onto a transfer substrate to form an image on the transfer substrate at a first temperature which is below a sublimation temperature of the sublimation colorant; curing the image on the transfer substrate; and optionally, bringing the transfer substrate into contact with a final image-receiving substrate, optionally applying pressure, and heating to a second temperature which is sufficient to cause the sublimation colorant to sublime and form a permanent image on the final image-receiving substrate.

Commonly assigned U.S. patent application Ser. No. 12/611,336, filed Nov. 3, 2009, of Yulin Wang, Ke Zhou, Edward G. Zwartz, and T. Hwee Ng, entitled "Chemical Toner Containing Sublimation Colorant For Secondary Transfer Process," which is hereby incorporated by reference herein in its entirety, describes a chemical toner composition that includes at least one curable amorphous resin and at least one sublimation colorant.

BACKGROUND

Disclosed herein is a curable sublimation marking material and a transfer printing method comprising applying a curable sublimation marking material comprising at least one curable component and at least one sublimation colorant in a desired pattern onto a transfer substrate to form an image on the transfer substrate at a first temperature which is below a sublimation temperature of the sublimation colorant; curing the image on the transfer substrate; and optionally, bringing the transfer substrate into contact with a final image-receiving substrate and heating to a second temperature which is sufficient to cause the sublimation colorant to sublime and form a permanent image on the final image-receiving substrate.

Transfer printing processes and materials are in great demand. The imaging of textiles and other substrates using thermal transfer of sublimation dyes has been commercially practiced for more than 50 years. Transfer printing generally comprises preparing a transfer sheet or substrate bearing the image to be transferred, and subsequently transferring the image from the transfer sheet or substrate to a permanent substrate upon which the image is to permanently appear. The original printers for sublimation printing processes employed electrostatic printing technology using toners and marking materials. More recently, sublimation printing processes employ large format ink jet printers using specially formulated inks.

Generally, a sublimation dye process consists of two steps. In a first step, an ink or a toner containing a sublimation dye creates an image on a transfer sheet. In a second step, heating transfers the image to a permanent substrate. With heating, the sublimation dye vaporizes and is transferred onto the final substrate. Current sublimation dye processes can have disadvantages. For example, sublimation inks can require an organic solvent which needs to be evaporated. Sublimation toners can offset onto the permanent substrate or require excessive heating. For both ink and toner, the sublimation processes can be high energy processes.

Ink jet ink sublimation transfer printing typically employs sublimation dye inks comprising a pigment suspended in a liquid solvent such as water. The transfer printing process generally comprises two processes: a first transfer process wherein images are initially printed on an intermediate, such as coated transfer paper, as a reverse image of the final design; and a second transfer process wherein the reverse image is transferred from the transfer paper onto a final substrate, such as polyester fabric, typically using a heat press operating at an elevated temperature, such as from about 180° C. to about 210° C. Under high temperature and pressure, the dye turns into a gas, permeates the fabric, and then solidifies into its fibers. The fabric is permanently dyed with the final image and can be washed without damaging the quality of the image.

Traditional ink jet sublimation transfer inks are water based systems. Unlike traditional water-soluble ink jet inks containing dyes, sublimation transfer ink jet ink including a sublimation dye tends to cause clogging believed due to the generation of precipitates (aggregates), degradation of dispersion stability, and/or evaporation of moisture from the nozzles. In particular, when the printing apparatus is not operated for a long time, clogging is likely to occur due to evaporation of moisture. To address this issue, a humectant can be added to suppress the evaporation of moisture. However, the sublimation transfer method requires heating for a predetermined time at temperatures higher than the sublimation point of the sublimation dye. Therefore, even if a high-boiling organic solvent is used as a humectant, the solvent is evaporated at the heating temperature during sublimation transfer, resulting in environmental pollution.

Sublimation dye has been used in xerographic technology. Most color toner systems currently in use are formulated with low melt viscosity resin which can make the toner too tacky and sticky for use in sublimation dye transfer sheets which are used at elevated temperatures. These toner systems can prevent clean transfer of the dye alone (that is, free of unwanted resin transfer). Toners employing high molecular weight polymer resin have been proposed as an alternative to low molecular weight linear polymer resins, wherein the high molecular weight resin is from about 75,000 to about 300,000 and preferably above about 300,000 and where the Tg of the binder resin is at least about 160° C. However, the high molecular weight and high Tg polymer can require a very high temperature during the first fixing stage which is not an environmentally advantageous procedure and further can cause pre-sublimation of the dye.

U.S. Pat. No. 7,237,886, which is hereby incorporated by reference herein in its entirety, describes, in the Abstract thereof, an ink for sublimation transfer ink jet recording including water, at least one sugar alcohol containing not less than four OH groups, a sublimation dye, and a dispersant. The ink is printed on a sheet medium by ink jet printing, and then the sheet medium is heated to sublimate and transfer the sublimation dye onto an object to be dyed. The ink for ink jet recording and the sublimation transfer dyeing method using the ink not only can maintain performances such as storage stability and high-quality recording images, but also can reduce environmental pollution, effectively prevent nozzle clogging, and exhibit good dispersion stability. See also, U.S. Pat. No. 6,713,222, which is hereby incorporated by reference herein in its entirety.

Thermal transfer sublimation dyes have been incorporated into toners for sublimation transfer processes using laser printers for use, for example, with personal computers.

U.S. Pat. No. 6,270,933, which is hereby incorporated by reference herein in its entirety, describes, in the Abstract thereof, a commercially useful color thermal transfer dye sublimation toner comprising at least a binder resin and a sublimation dye component, the binder resin comprising a high molecular weight polymer having a molecular weight of about 75,000, and a temperature, $T_1$, of at least about 160° C., at which the viscosity is equal to $1 \times 10^3$, and the sublimation dye comprising a dye which sublimes at elevated temperatures above about 100° C. The invention further defines a process for the use of the toner.

U.S. Pat. No. 6,270,933, which is hereby incorporated by reference herein in its entirety, describes, in the Abstract thereof, a process for crosslinking an image comprising applying ultraviolet light to an image comprised of a toner containing an unsaturated resin and colorant.

U.S. Pat. No. 5,366,836, which is hereby incorporated by reference herein in its entirety, describes, in the Abstract thereof, a process for forming color xerographic images by using a toner which comprises one or more dyes. Also disclosed is a process for making a toner which comprises one or more dyes.

U.S. Patent Publication 2006/0100300, U.S. Ser. No. 10/981,528, which is hereby incorporated by reference herein in its entirety, describes, in the Abstract thereof, a composition including an unsaturated sulfopolyester amine resin, and processes for preparing and using thereof.

U.S. Pat. No. 7,479,307, which is hereby incorporated by reference herein in its entirety, describes, in the Abstract thereof, toner compositions comprised of a polymer, an optional colorant, and an UV light curable oligomer. Also disclosed are methods for producing a UV curable toner composition, the toner compositions produced thereby, and methods of utilizing the UV curable toner compositions in various painting applications.

U.S. Pat. No. 6,713,222, which is hereby incorporated by reference herein in its entirety, describes, in the Abstract thereof, a process for crosslinking an image comprising applying ultraviolet light to an image comprised of a toner containing an unsaturated resin and colorant.

U.S. Pat. No. 6,713,222, which is hereby incorporated by reference herein in its entirety, describes, in the Abstract thereof, an ink-jet ink composition suitable for use in secondary transfer processes wherein the ink-jet ink composition contains a pre-dispersion containing at least a sublimation colorant combined with an ink-jet ink containing at least a non-sublimable colorant. Upon printing, a monochrome substrate, a multi-color image can be transferred to a permanent substrate with the application of heat and pressure. The monochrome intermediate transfer image is created by the non-sublimable colorant upon printing. The multi-color permanent image is generated at elevated temperatures and pressure of the transfer process which cause the sublimation colorant to sublime and bond to the permanent substrate.

Currently available materials and processes for sublimation transfer are suitable for their intended purposes. However, a need remains for improved materials and methods for sublimation transfer applications. Specifically, a need remains for improved sublimation transfer materials and processes that are free of the potential adverse effect of oxidation-reduction on the sublimation dye as can be found with non-solvent humectants (sugar alcohol) in water based inks. Further, a need remains for improved sublimation transfer materials and processes that are green, for example, that do not require a high temperature in the fixing stage, and that do not cause the sublimation dye to pre-sublimate in the fixing stage.

The appropriate components and process aspects of the each of the foregoing U.S. patents and patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a transfer printing method comprising applying a curable sublimation marking material comprising at least one curable component and at least one sublimation colorant in a desired pattern onto a transfer substrate to form an image on the transfer substrate at a first temperature which is below a sublimation temperature of the sublimation colorant; curing the image on the transfer substrate; and optionally, bringing the transfer substrate into contact with a final image-receiving substrate, optionally applying pressure, and heating to a second temperature which is sufficient to cause the sublimation colorant to sublime and form a permanent image on the final image-receiving substrate.

Further described is a curable sublimation marking material comprising at least one curable component and at least one sublimation colorant; wherein the curable sublimation marking material is a traditional imaging material or a digital imaging material.

DETAILED DESCRIPTION

Figure 1:
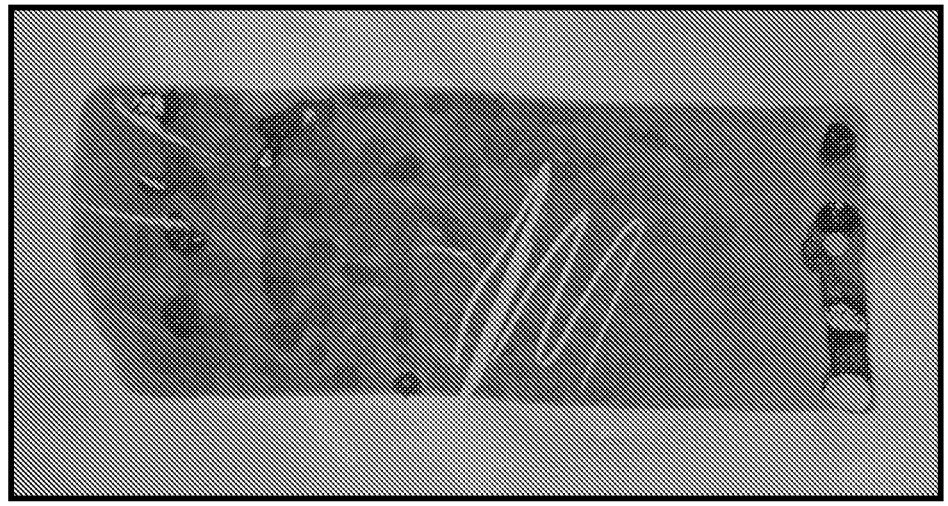
FIG. 1 illustrates a sublimation dye image (before curing) drawn down on Xerox® Digital Color Elite Gloss Paper coated paper.

Described is a sublimation transfer printing process based on sublimation dye technology. In embodiments, a curable sublimation marking material is described comprising at least one curable component and at least one sublimation colorant.

The curable sublimation marking material can be any suitable or desired material provided that the marking material is curable and capable of performing sufficiently in a sublimation transfer printing process. The term "curable" refers, for example, to the component or combination of components being polymerizable, that is, a material that may be cured via polymerization, including free radical routes, and/or in which polymerization is photo-initiated through use of a radiation sensitive photoinitiator. The curing method can comprise any suitable or desired curing method, in embodiments, thermal curing, radiation curing, and ultraviolet radiation curing.

In embodiments, the curable sublimation marking material comprises digital imaging materials, including, but not limited to, ink jet imaging materials, laser imaging materials, phase change imaging materials, and the like, and traditional imaging materials, including, but not limited to, offset imaging materials, gravure imaging materials, flexographic imaging materials, lithographic imaging materials, ribbon or screen printing imaging materials, and the like. Examples of suitable curable sublimation marking materials include, but are not limited to, curable materials including aqueous inks, solid or phase change inks, phase change gellant inks, digital inks, laser imaging materials, offset inks, gravure inks, flexographic inks, lithographic inks, ribbon or screen printing inks, conventional toners, chemical toners, emulsion aggregation toners, and the like. In embodiments, the curable sublimation marking material comprises an aqueous ink jet imaging material, an oil ink marking material, a solid ink marking material, a phase change ink imaging material, or a phase change gellant ink imaging material.

The transfer printing method herein is meant to encompass any image forming method suitable for use with the selected curable sublimation marking material and can include traditional printing, ink jet printing, xerographic imagine, draw down imaging, although not limited. In embodiments, the process includes a transfer printing method comprising applying a curable sublimation marking material comprising at least one curable component and at least one sublimation colorant in a desired pattern onto a transfer substrate to form an image on the transfer substrate at a first temperature which is below a sublimation temperature of the sublimation colorant; curing the image on the transfer substrate; and optionally, bringing the transfer substrate into contact with a final image-receiving substrate and heating to a second temperature which is sufficient to cause the sublimation colorant to sublime and form a permanent image on the final image-receiving substrate.

In embodiments, a curable sublimation transfer marking material herein comprises a conventional ink comprising a monomer, a photoinitiator, and a colorant. In other embodiments, a curable sublimation transfer marking material herein comprises an ink jet ink comprising a monomer, an oligomer, a photoinitiator, and a colorant.

In certain embodiments, a curable sublimation transfer marking material herein comprises a curable ink jet ink, in embodiments an ultra-violet (UV) curable ink jet ink, wherein the ink jet ink comprises at least one curable monomer, at least one oligomer or prepolymer, an optional initiator, and at least one sublimation colorant such as a sublimation dye or pigment and optional additives. In embodiments, the curable sublimation marking material is a phase change ink comprising at least one curable component such as a curable monomer or prepolymer; at least one monomer, oligomer, or prepolymer; optionally, at least one gellant, and an optional initiator.

In embodiments, the ink can be printed through piezoelectric print heads to produce a full color image, in the reverse format, on the transfer sheet, such as paper, followed by exposing via a curing system, in embodiments a UV curing system. The image can be cured quickly due to the extremely fast photo-induced crosslinking. A subsequent application of heat and, optionally, pressure, can be used to transfer the dye previously printed on the transfer sheet to a permanent substrate, for example, fabric, to provide a full color image without transferring resin component to the permanent substrate. Further, in embodiments, no solvent evaporation is experienced, thereby eliminating environment pollution from the transfer process.

In further embodiments, a curable sublimation transfer marking material comprises a curable toner. The curable toner can be any suitable or desired toner including conventional toner prepared by mechanical grinding processes and chemical toner prepared by chemical processes such as emulsion aggregation and suspension polymerization. In embodiments, the curable toner comprises a crosslinkable resin, optionally an initiator, and at least one sublimation colorant. The toner can be fused at a normal elevated temperature, such as from about 115° C. to about 145° C., from about 120° C. to about 140° C., from about 125° C. to about 140° C., or from about 125° C. to about 135° C., thereby providing a greener process. After fusing, the resin can be cross-linked. The cross-linked resin resists mass transfer of the toner resin system to the final image-receiving substrate during dye sublimation transfer, enabling clean transfer of the sublimation colorant.

The present disclosure encompasses use of the curable sublimation marking material, in embodiments, curable toner, curable ink, curable gellant ink, and curable phase change ink, in various technologies include textile printing and security imaging applications.

In embodiments, a curable phase change ink composition for sublimation transfer printing using ink jet technology is described. In further embodiments, a curable toner composition using xerographic technology for sublimation transfer printing is provided. The curable ink or toner comprises sublimation dyes or pigments and curable resin, which can provide a full color image, in the reverse format, on a transfer sheet, such as paper. The images can be cured on the transfer sheet, followed by application of heat, and optionally pressure, to transfer the dye or pigment to the final image-receiving substrate. The cross-linked resin remains on the transfer sheet. The permanent substrate, can be any suitable or desired final image receiving substrate, including, but not limited to, paper, plastic, fabric, ceramic, glass, and metals, and can include substrates where direct printed is not feasible due to the size, shape, thickness, or surface energy challenges of the permanent substrate.

Any suitable or desired curable component can be selected for the curable sublimation marking material. In embodiments, the at least one curable component comprises an acrylate, methacrylate, alkene, vinyl, or allylic ether functional group. In embodiments, the at least one curable component comprises at least one curable monomer or prepolymer that is a multifunctional acrylate or methacrylate compound. In specific embodiments, the multifunctional acrylate or methacrylate compound is propoxylated neopentyl glycol diacrylate, pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl)isocyanurate triacrylate, hexanediol diacrylate, tripropylene glycol diacrylate, dipropylene glycol diacrylate, amine modified polyether acrylate, trimethylolpropane triacrylate, glycerol propoxylate triacrylate, dipentaerythritol pentaacrylate, dipentaerythritol hexaacrylate, ethoxylated pentaerythritol tetraacrylate, or mixtures or combinations thereof.

Any suitable or desired monomer, oligomer, or prepolymer can be selected, in embodiments, the at least one monomer, oligomer, or prepolymer is an acrylate monomer, a methacrylate monomer, a multifunctional acrylate monomer, a multifunctional methacrylate monomer, a difunctional cycloaliphatic acrylate monomer, a trifunctional monomer, an acrylate ester, a dimethanol diacrylate cyclohexane difunctional monomer, an isocyanurate triacrylate trifunctional monomer, behenyl acrylate, acrylate curable wax, a low viscosity polyester acrylate monomer, a urethane acrylate, an epoxy, a polyester, or a mixture or combination thereof.

In embodiments, the curable marking materials are radiation curable. The term "radiation curable" is intended to cover all forms of curing upon exposure to a radiation source, including light and heat sources and including in the presence or absence of initiators. Radiation curing routes include, but are not limited to, curing using ultraviolet (UV) light, for example having a wavelength of about 200 to about 400 nanometers or more rarely visible light, such as in the presence of photoinitiators and/or sensitizers, curing using e-beam radiation, such as in the absence of photoinitiators, curing using thermal curing, in the presence or absence of high temperature thermal initiators (and which are generally largely inactive at the jetting temperature), and appropriate combinations thereof. In specific embodiments, curing herein comprises thermal curing or ultra-violet curing.

In embodiments, the initiator is a free-radical photoinitiator or photoinitiating moiety or an ultraviolet radiation activated photoinitiator.

In embodiments, a UV curable ink jet sublimation marking material herein comprises one or more low-viscosity polyester acrylate monomers, one or more high-molecular weight components, in embodiments having a molecular weight of from about 10,000 to about 30,000, including, but not limited to, acrylated urethanes, epoxies, polyesters, and acrylate oligomers, a photoinitiator, at least one sublimation dye or pigment, and optional additives.

The curable sublimation marking material can comprise an ultra-violet curable phase change ink comprising at least one low viscosity monomer, at least one high molecular weight monomer or oligomer, and an optional initiator. In embodiments, the low viscosity monomer comprises a low viscosity polyester acrylate monomer, an acrylate or methacrylate monomer compound, which are suitable for use as phase change ink carriers. Specific examples of relatively nonpolar acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures and combinations thereof. In addition, multifunctional acrylate and methacrylate monomers and oligomers can be included in the phase change ink carrier as reactive diluents and as materials that can increase the crosslink density of the cured image, thereby enhancing the toughness of the cured images. Different monomer and oligomers can also be added to tune the plasticity or elasticity of the cured objects. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003®), hexanediol diacrylate, tripropylene glycol diacrylate, dipropylene glycol diacrylate, amine modified polyether acrylates (available as PO 83 F®, LR 8869®, and/or LR 8889® (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494®), and the like, as well as mixtures and combinations thereof. When a reactive diluent is added to the ink carrier material, the reactive diluent is added in any desired or effective amount, in embodiments from at least about 1 to no more than about 80 percent by weight of the carrier, or from at least about 35 to no more than about 70 percent by weight of the carrier, although the amount of diluent can be outside of these ranges.

In embodiments, the ink vehicles contain at least one compound that can exhibit gel-like behavior in that it undergoes a relatively sharp increase in viscosity over a relatively narrow temperature range when dissolved in a liquid such as those compounds that behave as curable monomers when exposed to radiation such as ultraviolet light. One example of such a liquid curable monomer is a propoxylated neopentyl glycol diacrylate, such as SR9003®, commercially available from Sartomer Co. Inc.

In one embodiment, some compounds as disclosed herein undergo a change in viscosity of at least about $10^3$ centipoise, in another embodiment at least about $10^5$ centipoise, and in yet another embodiment at least about $10^6$ centipoise over a temperature range of in one embodiment at least about 30° C., in another embodiment at least about 10° C., and in yet another embodiment at least about 5° C., although the viscosity change and temperature range can be outside of these ranges, and compounds that do not undergo changes within these ranges are also included herein.

In another embodiment, the curable marking material comprises a phase change ink vehicle comprising a radiation curable monomer or prepolymer; a photoinitiator; a reactive wax; and a gellant. Any suitable gellant can be used for the ink vehicles disclosed herein. In embodiments, a gellant such as described in U.S. patent application Ser. No. 11/290,202, filed Nov. 30, 2005, entitled "Phase Change Inks Containing Photoinitiator With Phase Change Properties and Gellant Affinity," with the named inventors Peter G. Odell, Eniko Toma, and Jennifer L. Belelie, the disclosure of which is incorporated by reference herein in its entirety. In embodiments, the gellant can be a compound of the formula

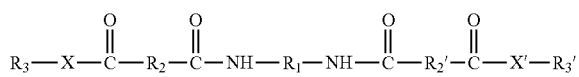

wherein R₁ is (i) an alkylene group, including linear and branched, saturated and unsaturated, cyclic and acyclic, and substituted and unsubstituted alkylene groups, and wherein heteroatoms either may or may not be present in the alkylene group, in embodiments having from 1 to 4 carbon atoms, (ii) an arylene group, including substituted and unsubstituted arylene groups, and wherein heteroatoms either may or may not be present in the arylene group, in embodiments having from 5 to 14 carbon atoms, (iii) an arylalkylene group, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, in embodiments having from 6 to 32 carbon atoms, or (iv) an alkylarylene group, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, in embodiments having from 6 to 32 carbon atoms, $R_2$ and $R_2'$ each, independently of the other, are (i) alkylene groups, including linear and branched, saturated and unsaturated, cyclic and acyclic, and substituted and unsubstituted alkylene groups, and wherein heteroatoms either may or may not be present in the alkylene group, in embodiments having from 1 to 54 carbon atoms, (ii) arylene groups, including substituted and unsubstituted arylene groups, and wherein heteroatoms either may or may not be present in the arylene group, in embodiments having from 5 to 14 carbon atoms, (iii) arylalkylene groups, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, in embodiments having 6 to 32 carbon atoms, or (iv) alkylarylene groups, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, in embodiments having 6 to 32 carbon atoms, $R_3$ and $R_3'$ each, independently of the other, are either (a) photoinitiating groups, or (b) groups which are (i) alkyl groups, including linear and branched, saturated and unsaturated, cyclic and acyclic, and substituted and unsubstituted alkyl groups, and wherein heteroatoms either may or may not be present in the alkyl group, having 2 to 100 carbon atoms, (ii) aryl groups, including substituted and unsubstituted aryl groups, wherein heteroatoms either may or may not be present in the aryl group, in embodiments having 5 to 100 carbon atoms, (iii) arylalkyl groups, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, in embodiments having 6 to 100 carbon atoms, or (iv) alkylaryl groups, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, in embodiments having 6 to 100 carbon atoms, and X and X' each, independently of the other, is an oxygen atom or a group of the formula —NR₄—, wherein R₄ is (i) a hydrogen atom, (ii) an alkyl group, including linear and branched, saturated and unsaturated, cyclic and acyclic, and substituted and unsubstituted alkyl groups, and wherein heteroatoms either may or may not be present in the alkyl group, in embodiments having 1 to 100 carbon atoms, (iii) an aryl group, including substituted and unsubstituted aryl groups, and wherein heteroatoms either may or may not be present in the aryl group, in embodiments having 5 to 100 carbon atoms, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, in embodiments having 6 to 100 carbon atoms, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, in embodiments having 6 to 100 carbon atoms, although in all cases wherein ranges are described herein, the number of carbon atoms can be outside of these ranges.

In embodiments, the gellants can comprise materials disclosed in U.S. patent application Ser. No. 11/290,121, filed Nov. 30, 2005, entitled "Phase Change Inks Containing Curable Amide Gellant Compounds," with the named inventors Eniko Toma, Jennifer L. Belelie, and Peter G. Odell, the disclosure of which is incorporated herein by reference herein in its entirety, including a compound of the formula

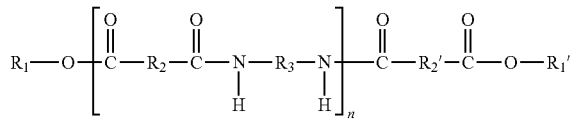

wherein $R_1$ and $R_1'$ each, independently of the other, is an alkyl group having at least one ethylenic unsaturation, in embodiments having 2 to 100 carbon atoms, an arylalkyl group having at least one ethylenic unsaturation, in embodiments having 6 to 100 carbon atoms, or an alkylaryl group having at least one ethylenic unsaturation, in embodiments having 6 to 100 carbon atoms, $R_2$, $R_2'$, and $R_3$ each, independently of the others, are alkylene groups, in embodiments having 2 to 100 carbon atoms, arylene groups, in embodiments having 5 to 100 carbon atoms, arylalkylene groups, in embodiments having 6 to 100 carbon atoms, or alkylarylene groups, in embodiments having 6 to 100 carbon atoms, and n is an integer representing the number of repeat amide units and is at least 1, although in all cases wherein ranges are described herein, the number of carbon atoms can be outside of these ranges.

The gellant compounds can be prepared by any desired or effective method. For example, in embodiments, gellants can be prepared as described in U.S. Pat. No. 7,259,275, entitled "Method for Preparing Curable Amide Gellant Compounds," with the named inventors Jennifer L. Belelie, Adela Goredema, Peter G. Odell, and Eniko Toma, and the disclosure of which is incorporated by reference herein in its entirety, which describes a process for preparing a compound of the formula

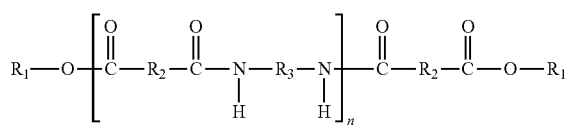

wherein $R_1$ is an alkyl group having at least one ethylenic unsaturation, in embodiments having 2 to 100 carbon atoms, an arylalkyl group having at least one ethylenic unsaturation, in embodiments having 6 to 100 carbon atoms, or an alkylaryl group having at least one ethylenic unsaturation, in embodiments having 6 to 100 carbon atoms, $R_2$ and $R_3$ each, independently of the others, are alkylene groups, in embodiments having 2 to 100 carbon atoms, arylene groups, in embodiments having 5 to 100 carbon atoms, arylalkylene groups, in embodiments having 6 to 100 carbon atoms, or alkylarylene groups, in embodiments having 6 to 100 carbon atoms, and n is an integer representing the number of repeat amide units and is at least 1, or from 1 to 20, although in all cases wherein ranges are described herein, the number of carbon atoms can be outside of these ranges, said process comprising: (a) reacting a diacid of the formula

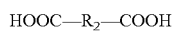

with a diamine of the formula

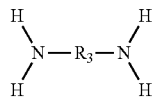

wherein $R_2$ and $R_3$ are as described above, in the absence of a solvent while removing water from the reaction mixture to form an acid-terminated oligoamide intermediate; and (b) reacting the acid-terminated oligoamide intermediate with a monoalcohol of the formula

wherein $R_1$ is as described above, in the presence of a coupling agent and a catalyst to form the product.

In further embodiments, the curable sublimation marking material comprises a curable toner comprising at least one curable amorphous resin and optionally, a crystalline resin.

The curable amorphous resin can be any suitable or desired curable amorphous resin. In embodiments, the at least one curable amorphous resin is selected from the group consisting of epoxy resins, poly-functional epoxy resins, unsaturated polyester resins, carboxy-functional polyester resins, hydroxy-functional polyester resins, polyol resins, polycarboxylic acid resins, poly(epoxy-acrylic acid)-unsaturated polyimide resins, unsaturated polyamide resin, unsaturated polycarbonate resins, a polyester resin including one or more fumarate or one or more maleate groups, an epoxy functionalized resin, a polyol functionalized resin, an acid functionalized resin and an isocyanate functionalized resin, and mixtures and combinations thereof.

The optional crystalline polyester can be any suitable or desired crystalline polyester. In embodiments, the crystalline polyester resin comprises a polyester selected from the group consisting of poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(dodecylene-sebacate), poly(ethylene-dodecanedioate), poly(propylene-dodecanedioate), poly(butylene-dodecanedioate), poly(pentylene-dodecanedioate), poly(hexylene-dodecanedioate), poly(octylene-dodecanedioate), poly(nonylene-dodecanedioate), poly(decylene-dodecandioate), poly(undecylene-dodecandioate), poly(dodecylene-dodecandioate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfoisophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), and combinations thereof.

In embodiments, the curable sublimation marking material further contains at least one sublimation colorant. If desired, multiple sublimation colorants may be used. The sublimation colorant can be any suitable or desired sublimation colorant. Such colorants may include sublimation dyes and sublimation pigments. Sublimation dyes are commonly referred to as disperse dyes and generally sublime at a temperature between about 120° C. and about 220° C., or up to about 400° C. Typical dyes, classified in the Color Index under the title "Disperse Dyes," generally belong to groups comprising azo, anthraquinone, phthalocyanine, indophenol, indoaniline, perinone, quinophthalone, acridine, xanthone, diazine, and oxazine dyes, and can be diffused into the toner particles. In embodiments, the sublimation colorant comprises a high purity, low salt disperse dye suitable for use in the UV sublimation ink dispersions. For example, Disperse blue 359, Disperse red 60, Disperse yellow 54, and Disperse blue 72 can be selected.

In embodiments, the sublimation colorant is a sublimation dye selected from the group consisting of azo dyes, anthraquinone dyes and phthalocyanine dyes. Colorants commonly used in conventional UV phase change inks can also be selected for the present sublimation marking materials. For example, colorants such as SR 1131®, SR 1126®, and LFC 1708® available from Lamberti USA can be selected.

Suitable sublimation dyes can also include, for example, dyes manufactured by Sensient, such as, Intratherm® Yellow P-1343NT, Intratherm® Yellow P-1346NT, Intratherm® Yellow P-346, Intratherm® Brilliant Yellow P-348, Intratherm® Brilliant Orange P-365, Intratherm® Brown P-1301, Intratherm® Dark Brown P-1303, Intratherm® Pink P-1335NT, Intratherm® Brilliant Red P-1314NT, Intratherm® Red P-1339, Intratherm® Blue P-1305NT, Intratherm® Blue P-1404, C.I. Disperse Blue 359, Intratherm® Orange P-367 Intratherm® Brilliant Blue P-1309, C.I. Disperse Red 60, Intratherm® Yellow P-343NT; dyes manufactured by the Organic Dyestuffs Corporation, Orco® Transfer Blue 2R, Orco® Transfer Scarlet B, Orco® Transfer Yellow 3G, dyes manufactured by ECS Specialty Ink & Dyes, Ltd., such as, Subli® Blue 770, Subli® Red 770, Subli® Yellow 781, Subli® Black 774. Other suitable examples include C.I. Disperse Yellow 3, 23, 25, 42, 54, 64, 79, 82, 83, 93, 99, 100, 119, 122, 124, 126, 160, 184:1, 186, 198, 199, 204, 211, 224 and 237; Disperse Blue 60, C.I. Disperse Orange 1, 3, 7, 13, 25, 29 31:1, 33, 49, 54, 55, 66, 73, 118, 119, and 163; C.I. Disperse Red 1, 13, 54, 60, 72, 73, 86, 88, 91, 92, 93, 111, 126, 127, 134, 135, 143, 145, 152, 154, 159, 164, 167:1, 177, 181, 204, 206, 207, 221, 239, 240, 258, 277, 278, 283, 288, 311, 323, 343, 348, 356 and 362, C.I. Disperse Violet 1, 33, C.I. Disperse Blue 3, 14, 19, 26, 56, 60, 73, 79:1, 87, 87:1, 113, 128, 143, 148, 154, 158, 165, 15:1, 165:2, 176, 180, 183, 185, 197, 198, 201, 214, 224, 225, 257, 266, 267, 287, 354, 359, 365 and 368; C.I. Disperse Green 6:1 and 9, and other suitable dye materials. Other examples include Eastman Fast Yellow 8GLF, Eastman Brilliant Red FFBL, Eastman Blue GBN, Eastman Polyester Orange 2RL, Eastman Polyester Yellow GLW, Eastman Polyester Dark Orange RL, Eastman Polyester Pink RL, Eastman Polyester Yellow 5GLS, Eastman Polyester Red 2G, Eastman Polyester Blue GP, Eastman Polyester Blue RL, Eastone Yellow R-GFD, Eastone Red B, Eastone Red R, Eastone Yellow 6GN, Eastone Orange 2R, Eastone Orange 3R, Eastone Orange GRN, Eastman Red 901, Eastman Polyester Blue 4RL, Eastman Polyester Red B-LSW, Eastman Turquoise 4G, Eastman Polyester Blue BN-LSW, (all available from the Eastman Kodak Co., Rochester, N.Y.). However, a disperse dye is not limited to these dyes.

Other dyes useful in the process of making and using the present curable sublimation marking materials include ICI Disperse Red; DuPont Disperse Blue 60; Bayer Resiren® Red TB; and Bayer Macrolex® G. Additional examples of dyes which may also be suitable for use herein include BASF Lurifix® Blue 590, BASF Lurifix® Orange, BASF Lurifix® Red 380, BASF Lurifix® Red 420, BASF Lurifix® Yellow 150, ICI Dispersol® Red B2B, ICI Dispersol® Yellow BGB and ICI Dispersol® Blue BN. Such dye materials are also available commercially from Keystone Aniline Corporation, Crompton & Knowles, BASF, Bayer, E. I. du Pont de Nemours & Co., Ciba, ICI, and others. In embodiments, the selected dye is thermally and chemically stable, compatible with the polymers in the curable sublimation marking material and with any other additives, and is colorfast.

In embodiments, the sublimation colorant has a low specific heat of from about 1.5 to about 2 Joules per gram-degree Centigrade, and a low latent heat of fusion of from about 20 to about 150 J/g. The melting points of sublimation colorant can be, in embodiments, from about 150° C. to about 250° C. In embodiments, the colorants have a specific heat of about 1.8 Joules per gram-degree Centigrade and have a latent heat of fusion between about 30 and about 120 Joules per gram. The selected dyes sublime easily and are expected to be uniformly imbibed when deposited upon toner particles or other selected marking material. Some of the dyes described above are also disclosed in U.S. Pat. No. 4,081,277, the entire disclosure of which is incorporated herein by reference.

The sublimation colorant may be present in the curable sublimation marking material in any desired or effective amount to obtain the desired color or hue such as from about 0.1 to about 50, from about 0.2 to about 20, or from about 0.5 to about 10 percent by weight of the curable sublimation marking material.

The curable sublimation marking material may also include a non-sublimation colorant such as a pigment. The non-sublimation pigment can be any pigment that imparts a color to the marking material, but does not sublime at a temperature between about 120° C. and about 300° C. For example, if the curable sublimation marking material is employed in a transfer printing process, the non-sublimation pigment may be used to print a first colored image on the transfer substrate. The color of the first colored image is the same color as the non-sublimation pigment. After heat and/or pressure is applied to the transfer substrate, a second colored image that may be the same or entirely different from the first colored image is transferred to the permanent substrate. Such a process would be useful to record different images for document security purposes.

The curable sublimation marking material can include different types of sublimation colorants each having different sublimation temperatures one from another. In embodiments, the curable sublimation marking material can include a first sublimation colorant having a first sublimation temperature, and a second sublimation colorant having a second sublimation temperature, wherein the first sublimation temperature and the second sublimation temperature are different. In other embodiments, the curable sublimation marking material can include a first sublimation colorant having a first sublimation temperature, a second sublimation colorant having a second sublimation temperature, and a third sublimation colorant having a third sublimation temperature, wherein the first sublimation temperature, the second sublimation temperature, and the third sublimation temperature are all different. For example, in embodiments, the curable sublimation marking material can include a first sublimation colorant having a sublimation temperature that is higher than about 220° C. and a second, different sublimation colorant having a sublimation temperature that is lower than about 180° C. In other embodiments, the curable sublimation colorant can include a first sublimation colorant having a sublimation temperature in the range of about 130° C. to about 180° C., a second sublimation colorant having a sublimation temperature in the range of about 180° C. to about 210° C., and a third sublimation colorant having a sublimation temperature in the range of about 220° C. to about 300° C., in embodiments, wherein each of the first, second, and third sublimation temperatures are different. In this way, curable marking materials herein containing one or more different sublimation colorants can be used to print multi-colored images on the same transfer substrate. After heating to the different sublimation temperatures, alone or in combination with application of pressure, different permanent images can be achieved. This embodiment can be used for various applications, and in specific embodiments, for security applications.

In embodiments, the curable sublimation marking material can comprise a first sublimation colorant having a first sublimation temperature; a second sublimation colorant having a second sublimation temperature; and optionally, one or more additional sublimation colorants; wherein the first sublimation colorant has a first sublimation temperature, the second sublimation colorant has a second sublimation temperature that is different from the first sublimation temperature, and wherein the third or more optional sublimation colorants, if present, each have a sublimation temperature that is different, such that each sublimation colorant has a unique sublimation temperature that is different from the sublimation temperature of every other sublimation colorant present.

In embodiments, the method herein can comprise applying two or more curable sublimation marking materials in a desired pattern onto a transfer substrate, wherein each sublimation marking material has a unique sublimation temperature that is different from the sublimation temperature of every other sublimation colorant present, to form one or more images on the transfer substrate at a first temperature which is below a sublimation temperature of each of the sublimation colorants present; curing the image on the transfer substrate; and optionally, bringing the transfer substrate into contact with a final image-receiving substrate, optionally applying pressure, and heating to a second, temperature which is sufficient to cause one of the sublimation colorants to sublime and form a permanent image on the final image-receiving substrate, heating to a third temperature which is sufficient to cause another of the sublimation colorants to sublime, and which third temperature is different from the second temperature, and form a permanent image on the final image-receiving substrate, and, repeatedly, heating to each unique temperature of each sublimation colorant present until each of the sublimation colorants present have sublimed.

Examples of suitable pigments for the non-sublimation pigment include PALIOGEN® Violet 5100 (commercially available from BASF); PALIOGEN® Violet 5890 (commercially available from BASF); HELIOGEN® Green L8730 (commercially available from BASF); LITHOL® Scarlet D3700 (commercially available from BASF); SUNFAST® Blue 15:4 (commercially available from Sun Chemical); Hostaperm® Blue B2G-D (commercially available from Clariant); Hostaperm® Blue B4G (commercially available from Clariant); Permanent Red P-F7RK; Hostaperm® Violet BL (commercially available from Clariant); LITHOL® Scarlet 4440 (commercially available from BASF); Bon Red® C (commercially available from Dominion Color Company); ORACET® Pink RF (commercially available from Ciba); PALIOGEN® Red 3871K (commercially available from BASF); SUNFAST® Blue 15:3 (commercially available from Sun Chemical); PALIOGEN® Red 3340 (commercially available from BASF); SUNFAST® Carbazole Violet 23 (commercially available from Sun Chemical); LITHOL® Fast Scarlet L4300 (commercially available from BASF); SUNBRITE® Yellow 17 (commercially available from Sun Chemical); HELIOGEN® Blue L6900, L7020 (commercially available from BASF); SUNBRITE® Yellow 74 (commercially available from Sun Chemical); SPECTRA PAC® C Orange 16 (commercially available from Sun Chemical); HELIOGEN® Blue K6902, K6910 (commercially available from BASF); SUNFAST® Magenta 122 (commercially available from Sun Chemical); HELIOGEN® Blue D6840, D7080 (commercially available from BASF); Sudan® Blue OS (commercially available from BASF); NEOPEN® Blue FF4012 (commercially available from BASF); PV Fast® Blue B2GO1 (commercially available from Clariant); IRGALITE® Blue BCA (commercially available from Ciba); PALIOGEN® Blue 6470 (commercially available from BASF); Sudan® Orange G (commercially available from Aldrich), Sudan® Orange 220 (commercially available from BASF); PALIOGEN® Orange 3040 (BASF); PALIOGEN® Yellow 152, 1560 (commercially available from BASF); LITHOL® Fast Yellow 0991K (commercially available from BASF); PALIOTOL® Yellow 1840 (commercially available from BASF); NOVOPERM® Yellow FGL (commercially available from Clariant); Ink Jet Yellow® 4G VP2532 (commercially available from Clariant); Toner Yellow HG® (commercially available from Clariant); Lumogen® Yellow D0790 (commercially available from BASF); Suco-Yellow® L1250 (commercially available from BASF); Suco-Yellow® D1355 (commercially available from BASF); Suco Fast Yellow® D1355, D1351 (commercially available from BASF); HOSTAPERM® Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL® Pink D4830 (commercially available from BASF); CINQUASIA® Magenta (commercially available from DU PONT); PALIOGEN® Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

The non-sublimation colorant may be present in the curable sublimation marking material in any desired or effective amount to obtain the desired color or hue such as from about 0.1 to about 20, from about 0.2 to about 15, or from about 0.5 to about 10 percent by weight of the curable sublimation marking material.

In embodiments, a stable dispersion of the sublimation colorant can be prepared in an aqueous solvent, the sublimination colorant particles having a particle size less than about 400 nanometers. The dispersion may also include a suitable dispersing aid, such as, for example dispersant MF, dispersant NND, sodium naphthalene sulphonate and/or surfactants such as, for example, the SURFYNOL® products marketed commercially by Air Products, TAMOL® products by Rohm & Haas, and BYK® products by Byk-Chemie, among others. The dispersions may then be treated to reduce the particle size, for example by grinding, homogenization, grinding followed by homogenization under high pressure, or other mechanical means.

The transfer substrate can be any suitable or desired transfer substrate or device. In embodiments, the transfer substrate comprises a transfer sheet.

The permanent image receiving substrate can be any suitable or desired image receiving substrate. In embodiments, the permanent image-receiving substrate comprises a material selected from the group consisting of wood, plastic, natural cloth, synthetic cloth, carpet material, concrete, glass, metal, porcelain and ceramic.

The curable sublimation marking material can be applied by any suitable or desired method. In embodiments, applying the curable sublimation marking material comprises traditional printing such as offset, gravure, flexographic, ribbon, or screen printing, draw down, among others, or digital imaging including ink jet printing, electrostatographic imaging, xerographic imaging, laser imaging, among others.

The sublimation dye technology herein can be used for providing images on various final substrates. In embodiments, the sublimation transfer printing process herein comprises a process for transferring images onto any suitable or desired substrate. In specific embodiments, the sublimation transfer printing process herein comprises a process for transferring images onto textiles.

The curable sublimation marking materials herein can be prepared by any suitable or desired method. In embodiments, the UV curable sublimation phase change ink can be prepared by dispersing a sublimation dye or pigment into desired monomers, oligomers, and other desired components using a 2 liter laboratory scale ball-mill followed by homogenization under high pressure, or other mechanical means to provide a dye or pigment dispersion. In embodiments, the pigment has a particle size of from about 50 to about 500 nanometers, or from about 150 to about 300 nanometers, and in specific embodiments, less than about 300 nanometers.

The curable sublimation marking materials can be applied to a transfer substrate by any suitable or desired method. In embodiments, the curable sublimation marking material can be printed, for example using piezoelectric print heads to produce a full color image on the transfer sheet, such as paper, followed by exposing the printed image using a curing system, in embodiments, a UV curing system or a thermal curing system. In embodiments, the image is cured quickly due to photo-induced crosslinking. The high glass transition temperature of the polymerization resin enables sublimation transfer of the sublimation colorant with no transferring of resin component to the final substrate. In embodiments, a 100% UV curable formulation is solvent free, eliminating solvent evaporation and the environmental pollution caused by solvent evaporation.

In further embodiments, a curable sublimation marking material herein comprises a curable toner composition comprising at least one cross-linkable resin, at least one sublimation colorant, an optional initiator, an optional wax, and an optional crystalline resin.

In embodiments, the curable toner composition is an emulsion aggregation (or chemical) toner including at least one curable amorphous resin, such those described in U.S. Patent Application Publication No. 2005/0191573, which is incorporated by reference herein in its entirety. A curable resin can be a resin that may be cured during a powder coating technique. The term "curable" can refer, for example, to the component or combination of components being polymerizable, that is, a material that may be cured via polymerization, including for example free radical routes, and/or in which polymerization is photo-initiated through use of a radiation sensitive photoinitiator.

Examples of curable amorphous resins include epoxy resins, poly-functional epoxy resins, unsaturated polyester resins, carboxy-functional polyester resins, hydroxy-functional polyester resins, polyol resins, polycarboxylic acid resins, poly(epoxy-acrylic acid)-unsaturated polyimide resins, unsaturated polyamide resin, unsaturated polycarbonate resins, and mixtures thereof.

In embodiments, the curable amorphous resin is an unsaturated resin. As such, the unsaturated resin is a polymer that is unsaturated, and can be crosslinked in the presence of activating radiation such as ultraviolet light and a suitable photo-initiator.

The cross-linkable resin can be either thermally curable or UV curable. In embodiments, a thermally curable resin, such as epoxy resin, is selected, and can be cross-linked upon heating during the first fusing/heating stage, with or without the presence of an initiator, for instance, a peroxide or AIBN (azobisisobutyronitrile) type initiator.

In other embodiments, a UV curable resin, such as an unsaturated polyester resin, and a UV initiator is employed. It has been shown that after fusing with the use of a post fusing UV system, unsaturated polyester resin-based toner can be cross-linked with UV light at the presence of a UV-initiator. Thus, the cross-linked resin is not be transferred to the secondary substrate during secondary transfer process In further embodiments, the curable amorphous resin is an unsaturated polyester resin comprising fumarate or maleate groups. Examples of suitable unsaturated polyester resin comprising fumarate or maleate groups include poly(propoxylated bisphenol-fumarate), poly(ethoxylated bisphenol-fumarate), poly(butyloxylated bisphenol-fumarate), poly(propoxylated bisphenol-maleate), poly(ethoxylated bisphenol-maleate), poly(butyloxylated bisphenol-maleate), copoly(diethylene-propylene terephthalate)-copoly(diethylene-propylene fumarate), copoly(propylene-terephthalate)-copoly(propylene-fumarate), copoly(diethylene-propylene terephthalate)-copoly(diethylene-propylene maleate), copoly(propylene-terephthalate)-copoly propylene-maleate), mixtures thereof and the like.

Unsaturated polyester resins can possess various glass transition temperatures, such as from about 30° C. to about 90° C., or from about 35° C. to about 80° C. as measured by differential scanning calorimetry (DSC). The unsaturated polyester resin may have, for example, a number average molecular weight (Mn), as measured by gel permeation chromatography (GPC) of from about 1,000 to about 75,000, or from about 2,000 to about 50,000. The weight average molecular weight (Mw) of the curable amorphous resin is about 150,000 or less, such as from about 2,000 to about 100,000, or from about 3,000 to about 50,000, as determined by GPC using polystyrene standards. The molecular weight distribution (Mw/Mn) of the unsaturated polyester resin is, for example, from about 2 to about 6, or more specifically, from about 2 to about 4.

In embodiments, the curable amorphous resin may be a thermal curable resin obtained from the reaction of an epoxy functionalized resin with a catalyst and polyol or an acid functionalized resin, such as polyacrylic acid, polymethacrylic acid, polystyrene acrylic acid, polystyrene methacrylic acid, polyester with acid end groups and the like. Thermal curable resins, may also be derived from a polyol and a difunctionalized isocyanate organic compound such as, for example, benzene diisocyanate, toluene diisocyanate, diphenylmethane diisocyanate, 1,6-hexamethylene diisocyanate, bis(4-isocyanatocyclohexyl)-methane, MODUR® CB-60, MONDUR® CB-75, MONDUR® MR, MONDUR® MRS 10, PAPI 27, PAPI 135, Isonate® 143L, Isonate® 181, Isonate® 125M, Isonate® 191, Isonate® 240, and ε-caprolactam blocked isocyanate polymers.

In embodiments, the curable amorphous resin can be derived from the addition polymerization of a mixture of olefinic monomers comprised of styrene, alkyl acrylate and/or alkyl methacrylate, acrylic acid, methacrylic acid and/or β-carboxyethylacrylate, glycidyl acrylate and/or glycidyl methacrylate. For example, a toner resin has the formula of

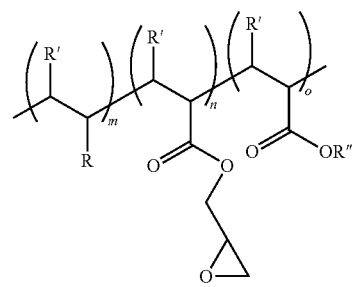

wherein R is a mixture of phenyl and carboxy-alkylate substituent, R' is a hydrogen or methyl substituent, and R" is a hydrogen or ethylcarboxylic acid substituent, and m, n and o are integers that represent segmental units of the resin that are randomly distributed within the resin.

The curable marking material may also include an optional curing agent. Examples of curing agents include epoxy phenol novolacs and epoxy cresol novolacs; isocyanate curing agents blocked with oximes, such as isopherone diisocyanate blocked with methyl ethyl ketoxime, tetramethylene xylene diisocyanate blocked with acetone oxime, and Desmodur® W (dicyclohexylmethane diisocyanate curing agent) blocked with methyl ethyl ketoxime; light-stable epoxy resins such as Santolink® LSE 120 supplied by Monsanto; alicyclic polyepoxides such as EHPE-3150® supplied by Daicel; polyfunctional amines; dicyanodiamide; bisphenol A; bisphenol S; hydrogenated bisphenol; polyphenolics; imidazoles, such as 2-methyl imidazole and 2-phenyl imidazole; betahydroxyalkylamide; uretdione; and polyfunctional isocyanates, such as 2,4-toluene diisocyanate, 2,6-toluene diisocyanate, alkaline diisocyanates, xylene-diisocyanate, isophorone-diisocyanate, methylene-bis(4-phenyl isocyanate), methylene-bis-(4-cyclohexyl)isocyanate, 3,3'-bitoluene-4-4'-diisocyanate, hexamethylene-diisocyanate, and naphthalene 1,5-diisocyanate; as well as other known or later developed curing agents and initiators.

The curable marking material may also include optionally one or more crystalline polyester resins. As used herein, "crystalline" refers to a polyester with a three dimensional order. "Semicrystalline resin" as used herein refers to resin with a crystalline percentage of from about 10 to about 90%, and more specifically from about 12 to about 70%. Further, as used herein "crystalline polyester resins" and "crystalline resins" encompass both crystalline resins and semicrystalline resins, unless otherwise specified.

In embodiments, the crystalline polyester resin is a saturated crystalline polyester resin or an unsaturated crystalline polyester resin.

Illustrative examples of crystalline polyester resins may include any of the various crystalline polyesters, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(dodecylene-sebacate), poly(ethylene-dodecanedioate), poly(propylene-dodecanedioate), poly(butylene-dodecanedioate), poly(pentylene-dodecanedioate), poly(hexylene-dodecanedioate), poly(octylene-dodecanedioate), poly(nonylene-dodecanedioate), poly(decylene-dodecanedioate), poly(undecylene-dodecanedioate), poly(dodecylene-dodecanedioate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfoisophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate) and combinations thereof.

The crystalline polyester resins, which are available from a number of sources, may possess various melting points of, for example, from about 30° C. to about 120° C., or from about 50° C. to about 90° C. The crystalline resin may have, for example, a number average molecular weight (Mn), as measured by gel permeation chromatography (GPC) of from about 1,000 to about 50,000, or from about 2,000 to about 25,000. The weight average molecular weight (Mw) of the resin is 50,000 or less, for example, from about 2,000 to about 50,000, or from about 3,000 to about 40,000, as determined by GPC using polystyrene standards. The molecular weight distribution (Mw/Mn) of the crystalline resin is, for example, from about 2 to about 6, and more specifically, from about 2 to about 4.

The crystalline resin may be prepared by a polycondensation process by reacting suitable organic diol(s) and suitable organic diacid(s) in the presence of a polycondensation catalyst. Generally, a stoichiometric equimolar ratio of organic diol and organic diacid is utilized, however, in some instances, wherein the boiling point of the organic diol is from about 180° C. to about 230° C., an excess amount of diol can be utilized and removed during the polycondensation process. The amount of catalyst utilized varies, and may be selected in an amount, for example, of from about 0.01 to about 1 mole percent of the resin. Additionally, in place of the organic diacid, an organic diester can also be selected, and where an alcohol byproduct is generated.

Examples of organic diols selected for the preparation of crystalline polyester resins include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of organic diacids or diesters selected for the preparation of the crystalline polyester resins include oxalic acid, succinic acid, glutaric acid, adipic acid, suberic acid, azelaic acid, sebacic acid, phthalic acid, isophthalic acid, terephthalic acid, napthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassium salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfo-p-hydroxybenzoic acid, N,N-bis(2-hydroxyethyl)-2-amino ethane sulfonate, or mixtures thereof. The organic diacid is selected in an amount of, for example, from about 40 to about 50 mole percent of the resin, and the alkali sulfoaliphatic diacid can be selected in an amount of from about 1 to about 10 mole percent of the resin.

Suitable crystalline polyester resins include those disclosed in U.S. Pat. No. 7,329,476 and U.S. Patent Application Pub. Nos. 2006/0216626, 2008/0107990, 2008/0236446 and 2009/0047593, each of which is hereby incorporated by reference in their entirety. In embodiments, a suitable unsaturated crystalline resin may include a resin composed of ethylene glycol and a mixture of dodecanedioic acid and fumaric acid co-monomers with the formula

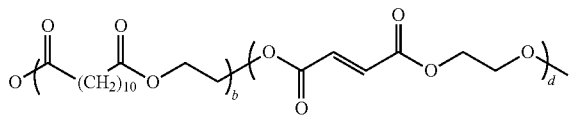

wherein b is from 5 to 2000 and d is from 5 to 2000.

If semicrystalline polyester resins are employed herein, the semicrystalline resin may include poly(3-methyl-1-butene), poly(hexamethylene carbonate), poly(ethylene-p-carboxy phenoxy-butyrate), poly(ethylene-vinyl acetate), poly(docosyl acrylate), poly(dodecyl acrylate), poly(octadecyl acrylate), poly(octadecyl methacrylate), poly(behenylpolyethoxyethyl methacrylate), poly(ethylene adipate), poly(decamethylene adipate), poly(decamethylene azelaate), poly(hexamethylene oxalate), poly(decamethylene oxalate), poly(ethylene oxide), poly(propylene oxide), poly(butadiene oxide), poly(decamethylene oxide), poly(decamethylene sulfide), poly(decamethylene disulfide), poly(ethylene sebacate), poly(decamethylene sebacate), poly(ethylene suberate), poly(decamethylene succinate), poly(eicosamethylene malonate), poly(ethylene-p-carboxy phenoxy-undecanoate), poly(ethylene dithionesophthalate), poly(methyl ethylene terephthalate), poly(ethylene-p-carboxy phenoxy-valerate), poly(hexamethylene-4,4'-oxydibenzoate), poly(10-hydroxy capric acid), poly(isophthalaldehyde), poly(octamethylene dodecanedioate), poly(dimethyl siloxane), poly(dipropyl siloxane), poly(tetramethylene phenylene diacetate), poly(tetramethylene trithiodicarboxylate), poly(trimethylene dodecane dioate), poly(m-xylene), poly(p-xylylene pimelamide), and combinations thereof.

Examples of suitable polycondensation catalysts for either the curable amorphous resin or crystalline polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts are selected in amounts of, for example, from about 0.01 mole percent to about 5 mole percent based on the starting diacid or diester used to generate the polyester resin.

The curable amorphous resin or crystalline polyester resin may be a branched resin. As used herein, the terms "branched" or "branching" includes branched resin and/or cross-linked resins. Branching agents for use in forming these branched resins include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount can be from about 0.1 to about 5 mole percent of the resin.

Linear or branched unsaturated polyesters selected for the in situ reactions between both saturated and unsaturated diacids (or anhydrides) and dihydric alcohols (glycols or diols). The resulting unsaturated polyesters are reactive (for example, crosslinkable) on two fronts: (i) unsaturation sites (double bonds) along the polyester chain, and (ii) functional groups such as carboxyl, hydroxy, and the like groups amenable to acid-base reactions. Typical unsaturated polyester resins are prepared by melt polycondensation or other polymerization processes using diacids and/or anhydrides and diols.

The monomers used in making the selected curable amorphous resin or crystalline polyester resin are not limited, and the monomers utilized may include any one or more of, for example, ethylene, propylene, and the like. Known chain transfer agents, for example dodecanethiol or carbon tetrabromide, can be utilized to control the molecular weight properties of the polyester. Any suitable method for forming the curable amorphous or crystalline polyester from the monomers may be used without restriction.

The curable amorphous resin and crystalline polyester resin may be present in an amount of from about 65 to about 99 percent by weight, such as about 75 to about 97 percent by weight, of the curable sublimation marking material, in embodiments, toner particles (that is, toner particles exclusive of external additives) on a solids basis. The ratio of crystalline resin to amorphous resin can be in the range from about 0:100 to about 50:50, such as from about 5:95 to about 35:65. However, amounts and ratios outside of these ranges can be used, in embodiments, depending upon the type and amounts of other materials present.

One, two, or more curable amorphous resins and/or crystalline polyester resins may be used. In embodiments where two or more of these resins are used, the resins may be in any suitable ratio (for example weight ratio) such as for instance about 5% (first resin)/95% (second resin) to about 95% (first resin)/5% (second resin).

The toner curable marking material particles described herein may be made by any suitable conventional process such as mechanical grinding or chemical process such as emulsion polymerization and suspension polymerization. Depending on the preparation method, the latex particles may have a very narrow size distribution or a broad size distribution.

For the purpose of illustration the embodiments described herein, the curable amorphous resin emulsion will be discussed below in reference to an emulsion polymerization method. An example of a method for generating a resin emulsion, optionally containing one or more photo-initiator, for the production of toner particles having the polyester resin is disclosed in U.S. Pat. No. 7,029,817, which is incorporated herein in its entirety by reference. Emulsion aggregation toner dispersions may be generated by other processes including, but not limited to, the melt mixing process disclosed in U.S. Pat. No. No. 7,432,324, which is incorporated herein in its entirety by reference, and the phase inversion process.

The toner particles may be created by the emulsion aggregation (EA) process, which are illustrated in a number of patents, such as U.S. Pat. Nos. 5,593,807, 5,290,654, 5,308,734, and 5,370,963, each of which are incorporated herein by reference in their entirety.

In embodiments, toner compositions may be prepared by any of the known emulsion-aggregation processes, such as a process that includes aggregating a mixture of a sublimation colorant and any other desired or required additives, and the emulsion comprised of the curable amorphous resin, and then coalescing the aggregate mixture. The curable amorphous resin emulsion may be prepared by dissolving the curable amorphous resin, optionally one or more radiation curable initiator, in a suitable solvent. In embodiments, the resin emulsion is prepared by dissolving the amorphous polyester resin and the optional crystalline polyester resin in a solvent.

In embodiments, the toner particles described herein may be radiation curable. Thus, for example, the term "radiation curable" is intended to cover all forms of curing upon exposure to a radiation source, including light and heat sources and including in the presence or absence of initiators. Example radiation curing routes include, but are not limited to, curing using ultraviolet (UV) light, for example having a wavelength of 200-400 nm or more rarely visible light, such as in the presence of photoinitiators and/or sensitizers, curing using e-beam radiation, such as in the absence of photoinitiators, curing using thermal curing, in the presence or absence of high temperature thermal initiators (and which are generally largely inactive at the jetting temperature), and appropriate combinations thereof.

In such embodiments, the chemical toner may further include an optional radiation curable initiator. For example, if the curable amorphous resin is cured via UV radiation, the chemical toner may include a photoinitiator. Examples of photoinitiators include, such as UV-photo-initiators including, for example, hydroxycyclohexylphenyl ketones; other ketones such as alpha-amino ketone and 4-(2-hydroxyethoxy)phenyl-(2-hydroxy-2-propyl)ketone; benzoins; benzoin alkyl ethers; benzophenones, such as 2,4,6-trimethylbenzophenone and 4-methylbenzophenone; trimethylbenzoylphenylphosphine oxides such as 2,4,6-trimethylbenzoyl-diphenyl-phosphine oxide or phenylbis(2,4,6-trimethylvbenzoyl) phosphine oxide (BAPO) available as IRGACURE 819 from Ciba; azo compounds; anthraquinones and substituted anthraquinones, such as, for example, alkyl substituted or halo substituted anthraquinones; other substituted or unsubstituted polynuclear quinines; acetophenones, thioxanthones; ketals; acylphosphines; and mixtures thereof. Other examples of photo-initiators include, but not limited to, 2-hydroxy-2-methyl-1-phenyl-propan-1-one and 2-isopropyl-9H-thioxanthen-9-one. In embodiments, the photo-initiator is one of the following compounds or a mixture thereof: a hydroxycyclohexylphenyl ketone, such as, for example, 2-hydroxy-4'-hydroxyethoxy-2-methylpropiophenone or 1-hydroxycyclohexylphenyl ketone, such as, for example, IRGACURE® 184 (Ciba-Geigy Corp., Tarrytown, N.Y.), having the structure

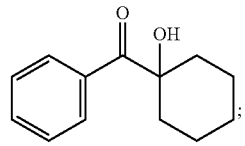 [SMILES: O=C(c1ccccc1)C1(O)CCCCC1 ; ";"]

a trimethylbenzoylphenylphosphine oxide, such as, for example, ethyl-2,4,6-trimethylbenzoylphenylphosphinate, such as, for example, LUCIRIN® TPO-L (BASF Corp.), having the formula

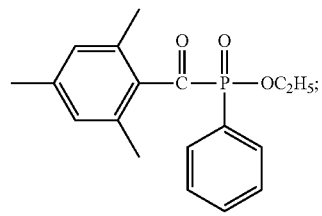 [SMILES: CCOP(=O)(C(=O)c1c(C)cc(C)cc1C)c1ccccc1]

a mixture of 2,4,6-trimethylbenzophenone and 4-methylbenzophenone, such as, for example, SARCURE™ SR1137 (Sartomer); a mixture of 2,4,6-trimethylbenzoyl-diphenyl-phosphine oxide and 2-hydroxy-2-methyl-1-phenyl-propan-1-one, such as, for example, DAROCUR® 4265 (Ciba Specialty Chemicals); alpha-amino ketone, such as, for example, IRGACURE® 379 (Ciba Specialty Chemicals); 4-(2-hydroxyethoxy)phenyl-(2-hydroxy-2-propyl)ketone, such as, for example, IRGACURE® 2959 (Ciba Specialty Chemicals); 2-isopropyl-9H-thioxanthen-9-one, such as, for example, DAROCUR® ITX (Ciba Specialty Chemicals); and mixtures thereof.

In embodiments, the chemical toner composition contains from about 0.5 to about 15 weight % of radiation curable initiator, such as from about 1 to about 15 weight %, or from about 3 to about 12 weight %, of radiation curable initiator.

The curable amorphous resin and optionally one or more radiation curable initiator are dissolved in the solvent, and is mixed into an suitable medium, for example water, such as deionized water optionally containing a stabilizer, and optionally a surfactant.

Suitable solvents include alcohols, ketones, esters, ethers, chlorinated solvents, nitrogen containing solvents and mixtures thereof. Specific examples of suitable solvents include acetone, methyl acetate, methyl ethyl ketone, tetrahydrofuran, cyclohexanone, ethyl acetate, N,N dimethylformamide, dioctyl phthalate, toluene, xylene, benzene, dimethylsulfoxide, mixtures thereof, and the like. If desired or necessary, the resin and the optional curable initiator can be dissolved in the solvent at elevated temperature of from about 40° C. to about 85° C., from about 50° C. to about 80° C. or from about 60° C. to about 70° C., although the temperature is desirably lower than the glass transition temperature or melting point of the resin(s). In embodiments, the curable amorphous resin and the optional curable initiator are dissolved in the solvent at an elevated temperature, but below the boiling point of the solvent, such as from about 2° C. to about 15° C. or from about 5° C. to about 10° C. below the boiling point of the solvent.

Examples of stabilizers include water-soluble alkali metal hydroxides, such as sodium hydroxide, potassium hydroxide, lithium hydroxide, beryllium hydroxide, magnesium hydroxide, calcium hydroxide, or barium hydroxide; ammonium hydroxide; alkali metal carbonates, such as sodium bicarbonate, lithium bicarbonate, potassium bicarbonate, lithium carbonate, potassium carbonate, sodium carbonate, beryllium carbonate, magnesium carbonate, calcium carbonate, barium carbonate or cesium carbonate; or mixtures thereof. In embodiments, a particularly desirable stabilizer is sodium bicarbonate or ammonium hydroxide. When the stabilizer is used in the composition, it is typically present in amounts of from about 0.1 percent to about 20 percent, such as from about 0.5 percent to about 10 percent, by weight of the resin(s). When such salts are added to the composition as a stabilizer, it is desired in embodiments that incompatible metal salts are not present in the composition. For example, when these salts are used, the composition should be completely or essentially free of zinc and other incompatible metal ions, for example, Ca, Fe, Ba, etc., that form water-insoluble salts. The term "essentially free" refers, for example, to the incompatible metal ions as present at a level of less than about 0.01 percent, such as less than about 0.005 percent or less than about 0.001 percent, by weight of the resins. If desired or necessary, the stabilizer can be added to the mixture at ambient temperature, or it can be heated to the mixture temperature prior to addition.

Optionally, an additional stabilizer such as a surfactant may be added to the above medium such as to afford additional stabilization to the curable amorphous resin. One, two, or more surfactants may be utilized. The surfactants may be selected from ionic surfactants and nonionic surfactants. Anionic surfactants and cationic surfactants are encompassed by the term "ionic surfactants." In embodiments, the use of anionic and nonionic surfactants can additionally help stabilize the aggregation process in the presence of the coagulant, which otherwise could lead to aggregation instability.

In embodiments, the surfactant may be utilized in an amount of from about 0.01% to about 10%, from about 0.75% to about 5%, or from about 1% to about 3% by weight of the toner composition.

Examples of nonionic surfactants that can be utilized include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, and acids such as abitic acid, which may be obtained from Aldrich, or NEOGEN R™, NEOGEN SC™, NEOGEN RK™ which may be obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA® POWER BN2060 from Tayca Corporation (Japan), which are branched sodium dodecyl benzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, MIRAPOL® and ALKAQUAT®, available from Alkaril Chemical Company, SANIZOL® (benzalkonium chloride), available from Kao Chemicals, and the like, and mixtures thereof.

After the stabilizer or stabilizers are added, the resultant mixture can be mixed or homogenized for any desired time.

Next, the mixture is heated to flash off the solvent, and then cooled to room temperature. For example, the solvent flashing can be conducted at any suitable temperature above the boiling point of the solvent in water that will flash off the solvent, such as a temperature of from about 60° C. to about 100° C., or from about 70° C. to about 90° C. or about 80° C., although the temperature may be adjusted based on, for example, the particular resins and solvent used.

Following the solvent flash step, the curable amorphous resin emulsion may have an average particle diameter of from about 100 to about 500 nanometers, or from about 130 to about 300 nanometers as measured with a Honeywell MICROTRAC® UPA150 particle size analyzer.

In alternative embodiments, the curable amorphous resin emulsion may be prepared by a suitable process, such as, solvent flash or phase inversion emulsification and the like.

In embodiments, an emulsion aggregation curable sublimation toner can be prepared as follows. A pre-toner mixture can be prepared by combining the sublimation colorant, and optionally other materials, surfactant, and the curable amorphous resin. In embodiments, the pH of the pre-toner mixture is adjusted to from about 2.5 to about 4. The pH of the pre-toner mixture may be adjusted by an acid such as, for example, acetic acid, nitric acid or the like. Additionally, in embodiments, the pre-toner mixture optionally may be homogenized. If the pre-toner mixture is homogenized, homogenization may be accomplished by mixing at from about 600 to about 4,000 revolutions per minute. Homogenization may be accomplished by any suitable means, including, for example, an IKA Ultra Turrax T50 probe homogenizer.

Following the preparation of the pre-toner mixture, an aggregate mixture is formed by adding at least one aggregating agent (coagulant or flocculent) to the pre-toner mixture. The aggregating agent is generally an aqueous solution of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the pre-toner mixture at a temperature that is below the glass transition temperature (Tg) of the emulsion resin. In some embodiments, the aggregating agent may be added in an amount of from about 0.05 to about 3.0 pph with respect to the weight of toner. The aggregating agent may be added to the pre-toner mixture over a period of from about 0 to about 60 minutes. Aggregation may be accomplished with or without maintaining homogenization. Aggregation is accomplished at temperatures that are about or higher than room temperature.

Thus, the process calls for blending the amorphous polyester resin and/or the crystalline polyester resin, together in the presence of a sublimation colorant and optionally other additives, heating the blend slowly from room temperature to about from 28 to 60° C. in order to provide aggregated particles with an average size of from about 3 microns to about 12 microns, or about 6 micron particles, and have a circularity of, for example, about 0.900 to about 0.990 as measured on the FPIA Sysmex analyzer.

Following aggregation, the aggregates may be coalesced. Coalescence may be accomplished by heating the aggregated mixture to a temperature that is about 5° C. to about 20° C. above the Tg of the curable amorphous resin. Generally, the aggregated mixture is heated to a temperature of about 50° C. to about 60° C. In embodiments, the mixture may also be stirred at from about 100 to about 750 revolutions per minute to coalesce the particles. Coalescence may be accomplished over a period of from about 1 to about 20 hours.

Optionally, during coalescence, the particle size of the toner particles may be controlled and adjusted to a desired size by adjusting the pH of the mixture. Generally, to control the particle size, the pH of the mixture is adjusted to between about 5 to about 12 using a base such as, for example, sodium hydroxide.

After coalescence, the mixture may be cooled to room temperature. After cooling, the mixture of toner particles of some embodiments may be washed with water and then dried. Drying may be accomplished by any suitable method for drying including freeze drying. Freeze drying is typically accomplished at temperatures of about −80° C. for a period of about 48 hours.

Upon aggregation and coalescence, the toner particles of embodiments have an average particle size of from about 1 to about 15 microns, in further embodiments of from about 4 to about 15 microns, and, in particular embodiments, of from about 6 to about 11 microns, such as about 7 microns. The volume geometric size distribution (GSDV) by volume for (D84/D50) of the toner particles of embodiments may be in a range of from about 1.10 to about 1.55, and in particular embodiments of less than about 1.35.

In embodiments, the process may include the use of surfactants, emulsifiers, and other additives such as those discussed above. Likewise, various modifications of the above process will be apparent and are encompassed herein.

The toner particles described herein may further include other components, such as sublimation colorants and non-sublimation pigments, and various external additives.

The toner particles of the disclosure can optionally be formulated into a developer composition by mixing the toner particles with carrier particles. The carrier particles can be mixed with the toner particles in various suitable combinations. The toner concentration is usually about 2 to about 10 percent by weight of toner and about 90 to about 98 percent by weight of carrier. However, different toner and carrier percentages may be used to achieve a developer composition with desired characteristics.

In embodiments, any known type of image development system may be used in an image developing device, including, for example, magnetic brush development, jumping single-component development, hybrid scavengeless development (HSD), etc. These development systems are well known in the art, and further explanation of the operation of these devices to form an image is thus not necessary herein.

Once the image is formed with toners/developers or phase change inks described herein via a suitable image development method, such as transfer printing, the image is then printed to an image-receiving medium such as paper and the like and then transferred to different image-receiving medium. Transfer printing is a term broadly used to describe several different families of technology for making an image on a substrate. Those technologies include dye diffusion printing and thermal mass transfer printing.

In embodiments, the toner composition described herein may be employed in a secondary transfer process. As defined herein, the "secondary transfer process" is the process of transferring only the sublimation colorant to a permanent image-receiving substrate, while the non-transferred components remain on the transfer carrier sheet. The transfer may be accomplished by placing the transfer carrier sheet with the image printed thereon in contact with the surface of the permanent image-receiving substrate, and applying either heat or force to the transfer carrier sheet until the sublimation colorant transfers onto the surface of the permanent image-receiving substrate and forms an image. However, before being transferred to the permanent image-receiving substrate, the chemical toner composition described herein must be printed on the transfer sheet.

Imaging processes can include, for example, preparing an image with a xerographic device including a charging component, an imaging component, a photoconductive component, a developing component, a transfer component, and a fusing component. In embodiments, the development component may include a developer prepared by mixing a carrier with a toner composition described herein. The xerographic device may include a high speed printer, a black and white high speed printer, a color printer, and the like.

Once the image is formed with toners/developers via a suitable image development method such as any one of the aforementioned methods, the image may then be transferred to the transfer sheet.

In embodiments, the toners may be used in developing an image in an image-developing device utilizing a fuser roll member. Fuser roll members are contact fusing devices that are within the purview of those skilled in the art, in which heat and pressure from the roll may be used to fuse the toner composition to the transfer sheet. In embodiments, the fuser member may be heated to a temperature above the fusing temperature of the toner composition, but below the sublimation temperature of the sublimation colorant, for example to temperatures of from about 70° C. to about 160° C., in embodiments from about 80° C. to about 150° C., in other embodiments from about 90° C. to about 140° C., to transfer the image onto the transfer sheet. However, the image transferred to the transfer sheet must be a negative of the image desired on the image-receiving substrate.

To fix the toner to the image-receiving substrate, such as a sheet of paper or transparency, hot roll fixing is commonly used. In this method, the image-receiving substrate with the toner image thereon is transported between a heated fuser member and a pressure member with the image face contacting the fuser member. Upon contact with the heated fuser member, the toner melts and adheres to the image-receiving medium, forming a fixed image. This fixing system is very advantageous in heat transfer efficiency and is especially suited for high speed electrophotographic processes.

The transfer sheet may be comprised of a substrate sheet or multiple layers coated directly on top of the substrate sheet. Examples of additional layers coated on the substrate sheet include a peel layer, a scratch resistant layer, and/or an adhesive layer. Examples of transfer sheets are described in U.S. Pat. Nos. 7,033,974, 7,138,163, 6,951,696, 6,946,424, 7,510, 617, 6,849,311 and 6,800,166, the disclosures of which are incorporated by reference herein in their entirety.

Any substrate sheet used in conventional transfer sheets may be used as long as the substrate sheet has some level of heat resistance and strength. Suitable examples of substrate sheets include tissue papers, such as glassine paper, capacitor paper, and paraffin paper; and films of plastics, for example, polyesters, such as polyethylene terephthalate and polyethylene naphthalate, polypropylene, cellophane, polycarbonate, cellulose acetate, polyethylene, polyvinyl chloride, polystyrene, nylon, polyimide, polyvinylidene chloride, and ionomers. The thickness of the substrate sheet may be properly varied depending upon materials for the substrate sheet so that the substrate sheet has proper strength, heat resistance and other properties. In embodiments, the thickness of the substrate sheet may be from about 10 to about 100 micrometer (µm), from about 20 to about 80 µm and from about 30 to 75 µm.

The emulsion aggregation toner composition may be employed in a dye diffusion thermal transfer processes, wherein only the sublimation colorant is transferred to the image-receiving substrate by a dye diffusion thermal transfer process. Details of this process are described in U.S. Pat. No. Nos. 5,436,217, 5,902,771, 5,917,530, 6,052,139 and 6,057, 264, each of which are incorporated by reference herein in their entirety.

Before the printed image transferred to a permanent image-receiving substrate, the image is cured, so that only the sublimation colorant (not the curable amorphous resin and other chemical toner composition components) are transferred to the permanent image-receiving substrate. This curing can occur either during fusing, for example, via thermal curing wherein the polyester resin(s) crosslink upon heating or after fusing, for example, using actinic radiation. Examples of curing methods include thermal curing, ultraviolet radiation curing and free radical curing, which are described in U.S. Patent Application Pub. No. 2006/0100300, the disclosure of which is incorporated by reference in its entirety.

In embodiments where the toner composition is crosslinkable, such crosslinking may be accomplished in any suitable manner. For example, the toner resin may be crosslinked during fusing of the toner to the substrate where the toner resin is crosslinkable at the fusing temperature. Crosslinking also may be effected by heating the fused image to a temperature at which the toner resin will be crosslinked, for example in a post-fusing operation. In embodiments, crosslinking may be effected at temperatures of from about 200° C. or less, from about 70° C. to about 200° C., or from about 80° C. to about 180° C.

The curing may occur after fusing via an actinic radiation energy source having a wavelength in the ultraviolet or visible region of the spectrum, accelerated particles, such as electron beam radiation, thermal such as heat or infrared radiation, or the like. In embodiments, the energy is actinic radiation because such energy provides excellent control over the initiation and rate of crosslinking. Suitable sources of actinic radiation include, but are not limited to, mercury lamps, xenon lamps, carbon arc lamps, tungsten filament lamps, lasers, sunlight, and the like.

Ultraviolet radiation, especially from a medium pressure mercury lamp with a high speed conveyor under UV light, such as about 20 to about 70 m/min., can be used in embodiments, wherein the UV radiation is provided at a wavelength of about 200 to about 500 nm for about less than one second, although the disclosure is not limited thereto. In embodiments, the speed of the high speed conveyor can be about 15 to about 35 m/min. under UV light at a wavelength of about 200 to about 500 nm for about 10 to about 50 milliseconds (ms). The emission spectrum of the UV light source generally overlaps the absorption spectrum of the UV-initiator. Optional curing equipment includes, but is not limited to, a reflector to focus or diffuse the UV light, and a cooling system to remove heat from the UV light source.

In embodiments, the chemical toner composition describe above is brought into contact with a permanent image-receiving sheet and selectively, in accordance with a pattern information signal, heated to a temperature of about 100° C. to about 300° C. with a thermal printing head provided with a plurality of juxtaposed heat-generating resistors. Upon heating, the sublimation colorant is transferred from the selectively heated regions of the image receiver sheet and forms a pattern thereon. The shape and density of pattern on the permanent image-receiving substrate depend upon the pattern and intensity of heat applied to the toner composition. Examples of permanent image-receiving substrates include various materials such as wood, plastic, natural cloth, synthetic cloth, carpet material, concrete, glass, metal such as steel, porcelain and ceramic. Virtually any substrate can be used that can withstand a temperature of at least 145° C. for at least 10 seconds. The surface of suitable substrate could be coated by such as polyester coating material.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Preparation of colorant dispersion. Into a 100 milliliter beaker was added 1 gram of sublimation dye Disperse Blue 359, 0.53 grams (16.94 weight %) anionic surfactant (Tayca Corporation), and 18.5 grams of deionized water. The above mixture was sonicated for about 15 minutes, followed by centrifuge. The obtained dispersion had an average particle size of 310 nanometers, and a solid content of 1.66%.

Example 2

Curable ink solution preparation. Into a 100 milliliter beaker was added 8 grams of the Disperse Blue 359 dispersion of Example 1, and 8 grams (30 weight %) of unsaturated amorphous linear propoxylated bisphenol A fumarate resin emulsion (available under the trade name SPARII™ from Resana S/A Industrias Quimicas, Sao Paulo Brazil) which contains 4 weight % photo-initiator (Irgacure® 819). The curable ink solution mixture was stirred for about 10 minutes with a magnetic bar.

Example 3

Figure 2:
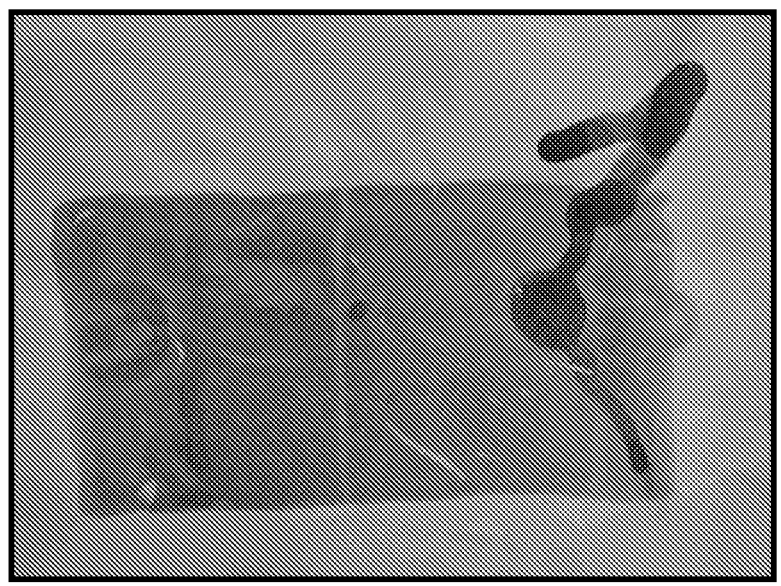
FIG. 2 illustrates a sublimation dye image (before curing) drawn down on white Instro® Glass coated paper.

Image formation. 2 drops of the ink solution of Example 2 were dropped onto 120 gsm (grams/m$^2$) DCEG® (Digital Color Elite Gloss) coated paper and drawn down with a draw bar. 2 drops of the ink solution of Example 2 were dropped onto 120 gsm white Instro Glass coated paper and drawn down with a draw bar. The obtained images had poor adhesion to both kinds of paper and were scratched off by a human nail, before curing, as shown in FIG. 1 (DCEG® paper) and FIG. 2 (white Instro Glass coated paper), respectively.

Example 4

Figure 3:
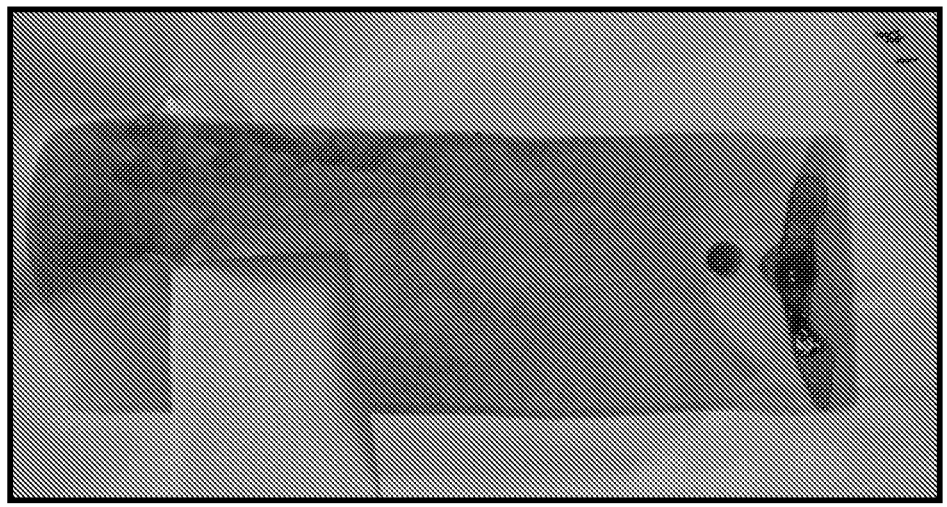
FIG. 3 illustrates a sublimation dye image (after curing) drawn down on Xerox® Digital Color Elite Gloss Paper coated paper.
Figure 4:
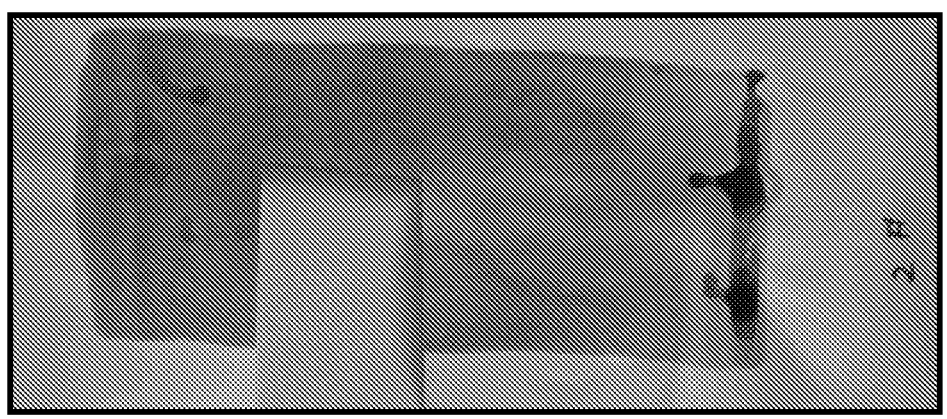
FIG. 4 illustrates a sublimation dye image (after curing) drawn down on white Instro® Glass coated paper.

Image curing. The drawn down images of Example 3 were cured using Fusion® UV system. The curing system was turned on, and the belt speed was adjusted to 32 feet per minute. The images of Example 3 were placed on the transport belt and the images were treated under the UV lamp for 4 passes to confirm that the images were cured completely. The images had good adhesion to the paper and could not be scratched off, as shown in FIG. 3 (DCEG® paper) and FIG. 4 (white Instro Glass coated paper), respectively.

Example 5

Figure 5:
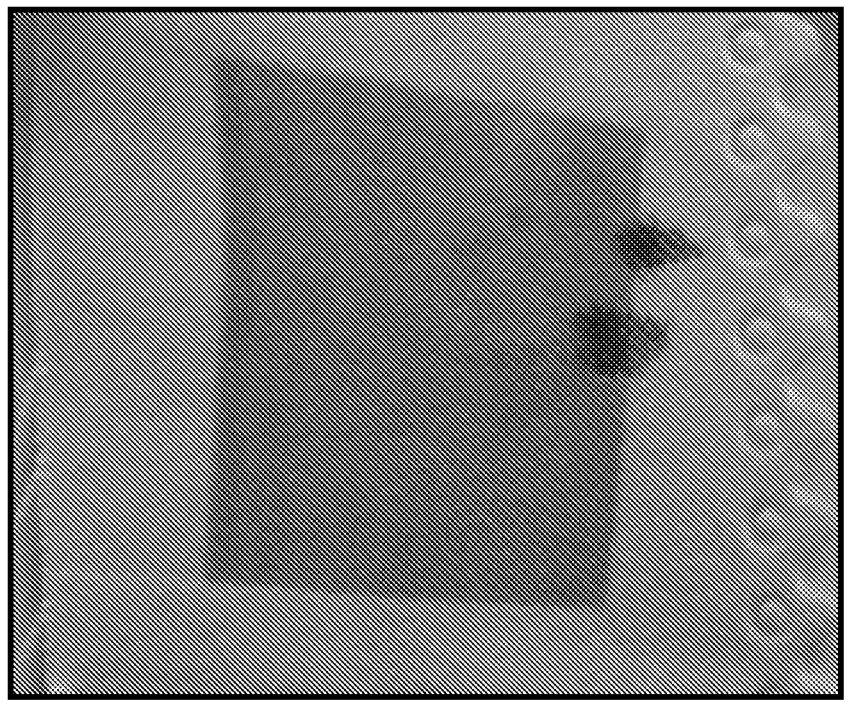
FIG. 5 illustrates a sublimation dye image drawn down on Xerox® Digital Color Elite Gloss Paper coated paper after curing and transfer to a polyester fabric.
Figure 6:
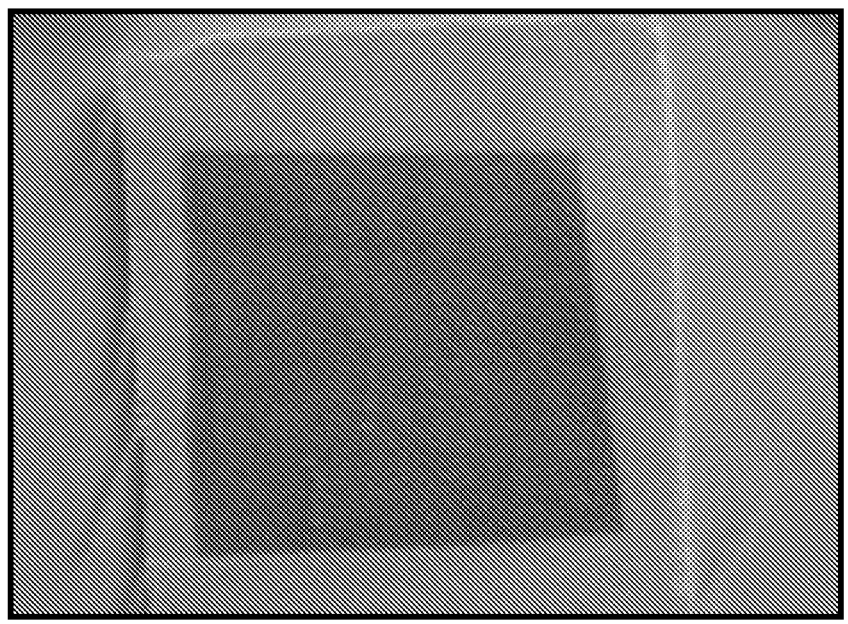
FIG. 6 illustrates a sublimation dye image drawn down on white Instro® Glass coated paper after curing and transfer to a polyester fabric.

Image transfer. The cured images were transferred to a polyester fabric using a hot plate set at 190° C. with pressure as follows. The hot plate was heated to 190° C. A small piece of each of the above papers of Example 4 with cured images were cut and placed on the hot plate with the image side facing up, and a pieced of white polyester fabric was placed on top of the cured image. A second iron plate was used to apply pressure to the polyester fabric for about 150 seconds. The images were transferred to the polyester perfectly, without transferring of the cured resin (that is, no resin adhesive transferred to the polyester fabric), and the fabric stayed flexible with a vivid image. The transferred images on the polyester are shown FIG. 5 (DCEG® paper) and FIG. 6 (white Instro Glass coated paper), respectively.

Comparative Example 6

Figure 7:
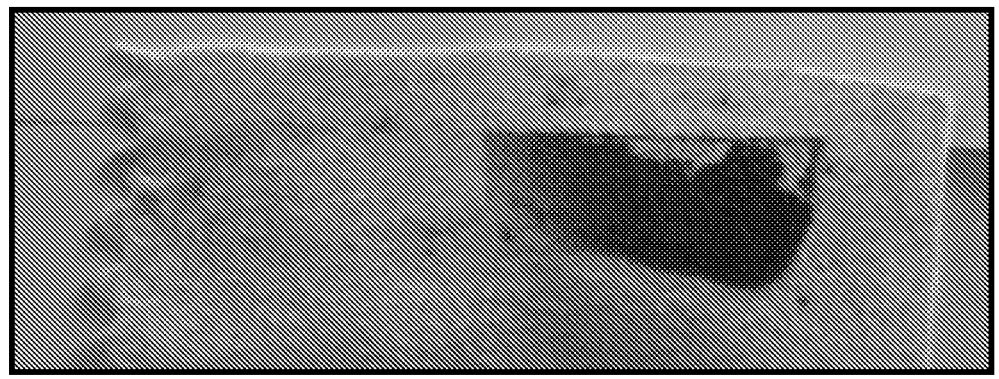
FIG. 7 illustrates a sublimation dye image drawn down on white Instro® Glass coated paper and transfer to a polyester fabric without curing.

As comparison, an image formed as in Example 3, was transferred to polyester fabric without exposure to a curing stage. The darkness of the image was caused by resin offset to the polyester fabric. FIG. 7 shows the transferred image on the polyester fabric from the non-cured image on the 120 gsm white Instro glass coated paper (inflexible fabric with dark color). The image on the fabric (resin/dye) was tacky when heated, and became stiff and inflexible when cooled down.

Example 7

Example 7 is prepared by dissolving the initiating agents in the oil soluble components with stirring. After complete dissolution, stirring is continued while the optional colorant is added to the. Finally, the temperature of the mixture is raised to about 110° C. above the melting point of the thermal solvent, and the thermal solvent is added with continuous stirring.

TABLE 1

| Example 7 | Component | % by Weight |
|---|---|---|
| Oil soluble components | Alkoxylated tetrahydrofurfuryl acrylate (Sartomer CD611 ®) | 15 |

TABLE 1-continued

| Example 7 | Component | % by Weight |
|---|---|---|
| | Trifunctional polyether acrylate (Laromer PO 43 F ®, BASF) | 12 |
| | Alkoxylated aliphatic diacrylate (Sartomer SR9209 ®) | 25 |
| Thermal solvents | 1,10-decanediol, MP = 72° C. | 30 |
| Colorant | Disperse Blue 359 | 6 |
| Initiating agents | IRGACURE 369 ® (Ciba) | 1.0 |
| | IRGACURE 907 ® (Ciba) | 2.0 |

Example 7 is further subjected to print testing using a modified XEROX PHASER® 850 ink jet printer, in which the temperature set points are reduced to 75° C. and transfused sharp images to 120 grams per square meter (gsm) white Instro Gloss coated paper. Transfuse of the ink composition is demonstrated between 200 to 500 psi (pounds per square inch) transfuse roll pressure. A standard PHASER® 860 drum, with standard oiling rates of 3-6 milligrams/page and standard transfuse rates of 20 inches/second, is used for the print testing of the ink composition of Example 7. The drum temperature is controlled at 32° C. throughout testing. Extremely robust images are obtained upon curing the jetted ink composition of Example 7 using a UV Fusion D bulb. A sample of the ink composition of Example 7 is cured on a glass slide under illumination from 415 nanometers LED array from UV Process Supplies.

The cured images are transferred to a polyester fabric using a hot plate set at 190° C. with pressure as follows. The hot plate is heated to 190° C. A small piece of each of the above coated papers with cured images is cut and placed on the hot plate with the image side facing up, and a pieced of white polyester fabric is placed on top of the cured image. A second iron plate is used to apply pressure to the polyester fabric for about 150 seconds. The images are transferred to the polyester perfectly, without transferring of the cured resin (that is, no resin adhesive transferred to the polyester fabric), and the fabric stays flexible with a vivid image.

Example 8

An ultra-violet curable phase change gellant ink is prepared containing 7.5 percent by weight curable amide gellant as described in Example VIII of U.S. Pat. No. 7,279,587, which is hereby incorporated by reference herein in its entirety, and propoxylated neopentyl glycol diacrylate (SR9003®, obtained from Sartomer Co. Inc.) are combined and stirred at 90° C. for 1 hour. The resulting mixture is filtered to 0.22 µm at 90° C., let cool to room temperature overnight, re-melted, and filtered to 0.22 µm at 90° C. To the resulting solution is then added 2-dimethylamino-2-(4-methylbenzyl)-1-(4-morpholin-4-ylphenyl)-butanone (IRGACURE® 379, obtained from Ciba Specialty Chemicals), isopropyl-9H-thioxanthen-9-one (DAROCUR® ITX, obtained from Ciba Specialty Chemicals), bis(2,4,6-trimethylbenzoyl)-phenyl-phosphine oxide (IRGACURE® 819, obtained from Ciba Specialty Chemicals), 2-hydroxy-1-(4-(4-(2-hydroxy-2-methylpropionyl)-benzyl)-phenyl)-2-methylpropan-1-one (IRGACURE® 127, obtained from Ciba Specialty Chemicals), and IRGASTAB® UV10 (obtained from Ciba Specialty Chemicals), and the entire solution is stirred for 1 hour at 90° C. The ink base thus prepared is then filtered to 0.22 µm and the hot solution (90° C.) is added dropwise to a stirring solution of the desired sublimation dispersion (Disperse Blue 359 dispersion, 25 wt %, Disperse Yellow 54 dispersion, 16 wt %, Disperse Red 60 dispersion, 21 wt %), also at 90° C. The resulting inks are then filtered to 6 µm.

The ink of Example 8 are jetted using a PHASER® 860 printer modified to change the intermediate transfer drum temperature, paper preheating temperature, and ink heating temperature and printed at temperatures ranging from 75 to 85° C. directly onto paper attached to an intermediate transfer member at 30° C. The inks are successfully jetted onto 120 gsm white Instro Gloss coated paper and 120 gsm DCEG® (Digital Color Elite Gloss) coated paper.

After printing, the markings prepared with the ink of Example 8 are cured by exposure to UV light from a UV Fusion LC-6B Benchtop Conveyor equipped with UV Fusion Light Hammer® 6 Ultraviolet Lamp System employing a "D" bulb for a minimum of 2-3 seconds to provide robust structures. The prints can neither be scratched nor smudged.

The cured images are transferred to a polyester fabric using a hot plate set at 190° C. with pressure as follows. The hot plate is heated to 190° C. A small piece of each of the above coated papers with cured images is cut and placed on the hot plate with the image side facing up, and a pieced of white polyester fabric is placed on top of the cured image. A second iron plate is used to apply pressure to the polyester fabric for about 150 seconds. The images are transferred to the polyester perfectly, without transferring of the cured resin (that is, no resin adhesive is transferred to the polyester fabric), and the fabric stays flexible with a vivid image.

Example 9

Preparation of amorphous resin-photoinitiator emulsion: 816.67 grams of ethyl acetate is added to 125 grams of propoxylated bisphenol A fumarate resin (Resapol®, available from Reichold Inc.) with a glass transition temperature of about 56° C. The resin is dissolved by heating to 65° C. on a hot plate and stirring at about 200 rpm. 100 grams of ethyl acetate is added to 3.75 grams of phenylbis(2,4,6-trimethylvbenzoyl) phosphine oxide (BAPO, available as Irgacure® 819) (3% by weight of resin). The BAPO is dissolved by heating to 65° C. on a hot plate and stirring at about 200 rpm. Once both solutions reach 65° C., the BAPO solution is added to the resin solution. In a separate 4 liter glass reactor vessel is added 3.05 grams (for an acid number of approximately 17) of sodium bicarbonate and 708.33 grams of deionized water. This aqueous solution is heated to 65° C. on a hot plate stirring at about 200 rpm. The dissolved resin, BAPO and ethyl acetate mixture is slowly poured into the 4 liter glass reactor containing the aqueous solution with homogenization at 4,000 rpm. The homogenizer speed is then increased to 10,000 rpm and left for 30 minutes. The homogenized mixture is placed in a heat jacketed Pyrex® distillation apparatus, with stirring at about 200 rpm. The temperature is increased to 80° C. at about 1° C./minute. The ethyl acetate is distilled from the mixture at 80° C. for 120 minutes. The mixture is cooled to below 40° C. then screened through a 20 micron screen. The mixture is pH adjusted to 7.0 using 4% NaOH solution and centrifuged. The resulting resin comprises 19% solids by weight in water, with a volume average diameter of about 165 nanometers as measured with a Honeywell Microtrac® UPA150 particle size analyzer.

Preparation of crystalline resin emulsion: 816.67 grams of ethyl acetate is added to 125 grams of copoly(ethylene-dodecanoate)-copoly-(ethylene-fumarate) crystalline resin. The resin is dissolved by heating to 65° C. on a hot plate and stirring at about 200 rpm. In a separate 4 liter glass reactor vessel is added 4.3 grams of TaycaPower® surfactant (47% aqueous solution, BN2060, available from Tayca Corporation, Japan), 3.05 grams (for an acid number of approximately 17) of sodium bicarbonate, and 708.33 grams of deionized water. This aqueous solution is heated to 65° C. on a hot plate with stirring at about 200 rpm. The dissolved resin, BAPO and ethyl acetate mixture is slowly poured into the 4 liter glass reactor containing the aqueous solution with homogenization at 4,000 rpm. The homogenizer speed is then increased to 10,000 rpm and left for 30 minutes. The homogenized mixture is placed in a heat jacketed Pyrex® distillation apparatus, with stirring at about 200 rpm. The temperature is ramped up to 80° C. at about 1° C./minute. The ethyl acetate is distilled from the mixture at 80° C. for 120 minutes. The mixture is cooled to below 40° C. and then screened through a 20 micron screen. The mixture is pH adjusted to 7.0 using a 4% NaOH solution and centrifuged. The resulting resin comprises 14.75% solids by weight in water, with a volume average diameter of about 204 nanometers as measured with a Honeywell Microtrac® UPA150 particle size analyzer.

Preparation of an ultra-low melt cyan toner comprising 78% by weight of amorphous unsaturated polyester resin, 13.8% by weight of a crystalline unsaturated polyester resin, 3.6% by weight of photoinitiator, 4.5 percent by weight of sublimation dye, and utilizing aluminum sulfate as coagulant. A 2 liter kettle is charged with 349.6 grams of the amorphous polyester-initiator emulsion described above, 88 grams of the crystalline resin described above, 250 grams of water, 9 grams of TaycaPower® surfactant (47% aqueous solution, BN2060, available from Tayca Corporation, Japan, 22.6 grams of Disperse Blue 359 Dispersion, and 50 grams of 0.3 N nitric acid solution until a pH of 3.7 is attained. The mixture is homogenized at 2,000 rpm, and 45 grams of a 1% aqueous solution of aluminum sulfate is added over a 5 minute period while simultaneously increasing the homogenizer to 4500 rpm. The mixture is then stirred at 200 rpm with an overhead stirrer and placed in a heating mantle. The temperature is increased to 47° C. over a 30 minute period, during which the particles grow to 7.6 microns. To this mixture is then added 4.5 grams of TaycaPower® (17.5% solution), followed by the addition of 4% sodium hydroxide until the pH of the mixture is about 5.3, followed by the addition of 1 gram of tetra sodium ethylenediamine-tetra-acetic acid (10% aqueous solution), followed by dropwise addition of sodium hydroxide until a pH of 7 is achieved. During this latter addition, the stirrer speed is reduced to 100 rpm. The mixture is then heated to 63° C. over 30 minutes, after which the pH is decreased to 6.0 with 0.3 N HNO$_3$ solution, and the mixture is heated to 68° C. over a 30 minute period, and then maintained at this temperature for an additional 2 hours until the particles spherodize. The toner displays a volume average particle size of about 7.7 microns with a GSD of 1.23 as measured with a Coulter Counter, and a circularity of about 0.98 as measured with a SYSMEX® FPIA-2100 flow-type histogram analyzer. The glass transition temperature of the toner is 55° C. utilizing a Scanning Differential calorimeter.

Unfused test images are made using a DC12® color copier/printer. Images are removed from the DC12® copier/printer before the page passes through the fuser. These unfused test samples are then fused using a Xerox® iGen3® fuser. Test samples are sent through the fuser using standard iGen3® process conditions (100 parts per million).

The fused prints are subsequently sent through a curing station to improve image robustness. Halogen lamps are attached to a Fusion® UV curing station. The heat lamps would heat the printed image before being exposed to the UV light. Test samples are sent through the heater and UV exposure station at iGen3® process speeds (100 parts per million).

The cured images are transferred to a polyester fabric using a hot plate set at 190° C. with pressure as follows. The hot plate is heated to 190° C. A small piece of each of the above coated papers with cured images is cut and placed on the hot plate with the image side facing up, and a pieced of white polyester fabric is placed on top of the cured image. A second iron plate is used to apply pressure to the polyester fabric for about 150 seconds. The images are transferred to the polyester perfectly, without transferring of the cured resin (that is, no resin adhesive is transferred to the polyester fabric), and the fabric stays flexible with a vivid image.

The sublimation colorant transfer process herein uses, in embodiments, a UV curable composition (for example, UV curable ink or UV curable toner) that provides a robust print in a first process step. In various embodiments, advantages of the present process include that the resin does not offset onto the permanent substrate, the process does not require solvent, a "greener" transfer process is provided requiring less energy than previous processes and reduced pollution as well as less unwanted transfer of resin to the substrate. In further embodiments, the sublimation colorant sublimes from the transfer sheet when heated even after being "trapped" by curing in a cross-linked polymer.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A transfer printing method comprising:
    applying a curable sublimation marking material comprising at least one curable component and at least one sublimation colorant in a desired pattern onto a transfer substrate to form an image on the transfer substrate at a first temperature which is below a sublimation temperature of the sublimation colorant;
    curing the image on the transfer substrate; and
    bringing the transfer substrate into contact with a final image-receiving substrate, optionally applying pressure, and heating to a second temperature which is sufficient to cause the sublimation colorant to sublime and form a permanent image on the final image-receiving substrate;
    wherein applying a curable sublimation marking material comprises applying two or more curable sublimation marking materials in a desired pattern onto a transfer substrate, wherein each sublimation marking material has a unique sublimation temperature that is different from the sublimation temperature of every other sublimation colorant present, to form one or more images on the transfer substrate at a first temperature which is below a sublimation temperature of each of the sublimation colorants present;
    curing the image on the transfer substrate; and
    bringing the transfer substrate into contact with a final image-receiving substrate, optionally applying pressure, and heating to a second, temperature which is sufficient to cause one of the sublimation colorants to sublime and form a permanent image on the final image-receiving substrate, heating to a third temperature which is sufficient to cause another of the sublimation colorants to sublime, and which third temperature is different from the second temperature, and form a permanent image on the final image-receiving substrate, and, repeatedly heating to each unique temperature of each sublimation colorant present until each of the sublimation colorants present have sublimed.

2. A curable sublimation marking material comprising at least one curable component and at least one sublimation colorant;
    wherein the curable sublimation marking material is capable of performing in a sublimation transfer printing process wherein:
    the curable sublimation marking material is applied in a desired pattern onto a transfer substrate to form an image on the transfer substrate at a first temperature which is below a sublimation temperature of the sublimation colorant;
    the image is cured on the transfer substrate;
    wherein the curable sublimation marking material comprises at least one curable component and two or more sublimation colorants, comprising:
    a first sublimation colorant having a first sublimation temperature;
    a second sublimation colorant having a second sublimation temperature; and
    optionally, one or more additional sublimation colorants;
    wherein the first sublimation colorant has a first sublimation temperature, the second sublimation colorant has a second sublimation temperature that is different from the first sublimation temperature, and wherein the one or more optional additional sublimation colorants, if present, each have a sublimation temperature that is different, such that each sublimation colorant has a unique sublimation temperature that is different from the sublimation temperature of every other sublimation colorant present.

3. The curable sublimation marking material of claim 2, wherein at least one sublimation colorant is a sublimation dye selected from the group consisting of azo dyes, anthraquinone dyes and phthalocyanine dyes.

4. The curable sublimation marking material of claim 2, wherein curable comprises thermally curable or radiation curable.

* * * * *